United States Patent [19]
Tada et al.

[11] Patent Number: 5,096,016
[45] Date of Patent: Mar. 17, 1992

[54] TRACTION CONTROL SYSTEM FOR A VEHICLE WITH AN INTERNAL COMBUSTION ENGINE

[75] Inventors: Tetsuya Tada; Takayoshi Nakatomi; Hiroharu Miyazaki, all of Susono; Kuhihisa Hayashi; Kenji Kondo, both of Toyota, all of Japan

[73] Assignee: Toyota Jidosha Kabushiki Kaisha, Toyota, Japan

[21] Appl. No.: 553,756

[22] Filed: Jul. 16, 1990

[30] Foreign Application Priority Data

Jul. 19, 1989 [JP] Japan ................... 1-186304
Aug. 23, 1989 [JP] Japan ................... 1-217082
Nov. 20, 1989 [JP] Japan ................... 1-299749

[51] Int. Cl.$^5$ ............................................ B60K 28/16
[52] U.S. Cl. ............................ 180/197; 364/426.01
[58] Field of Search ............... 180/197; 364/426.01, 364/426.02, 426.03, 426.04

[56] References Cited

U.S. PATENT DOCUMENTS

| | | |
|---|---|---|
| 4,637,487 | 1/1987 | Nakamura et al. ............. 180/197 |
| 4,811,808 | 3/1989 | Matsumoto et al. ....... 364/426.01 X |
| 4,873,639 | 10/1989 | Sato et al. ............................. 180/197 |
| 4,921,064 | 5/1990 | Wazaki et al. ....................... 180/197 |
| 4,962,570 | 10/1990 | Hosaka et al. .................. 180/197 X |
| 4,969,102 | 11/1990 | Tamura et al. ................. 180/197 X |

*Primary Examiner*—Charles A. Marmor
*Assistant Examiner*—Kevin Hurley
*Attorney, Agent, or Firm*—Kenyon & Kenyon

[57] ABSTRACT

A slip control device for a vehicle provided with an internal combustion engine, wherein an engine output torque is controlled independently of a depression of the accelerator pedal so that slip at the driving wheels of the vehicle is controlled. A stand-by means is provided and operates, upon a prediction of an occurrence of slip at the vehicle wheels, to close the throttle valve to a stand-by degree of opening thereof before the occurrence of the slip. The stand-by degree of opening of the throttle valve is controlled in accordance with an engine torque of the engine when the occurrence of slip is predicted. Thus the occurrence of slip is effectively prevented and a good acceleration performance obtained.

16 Claims, 16 Drawing Sheets

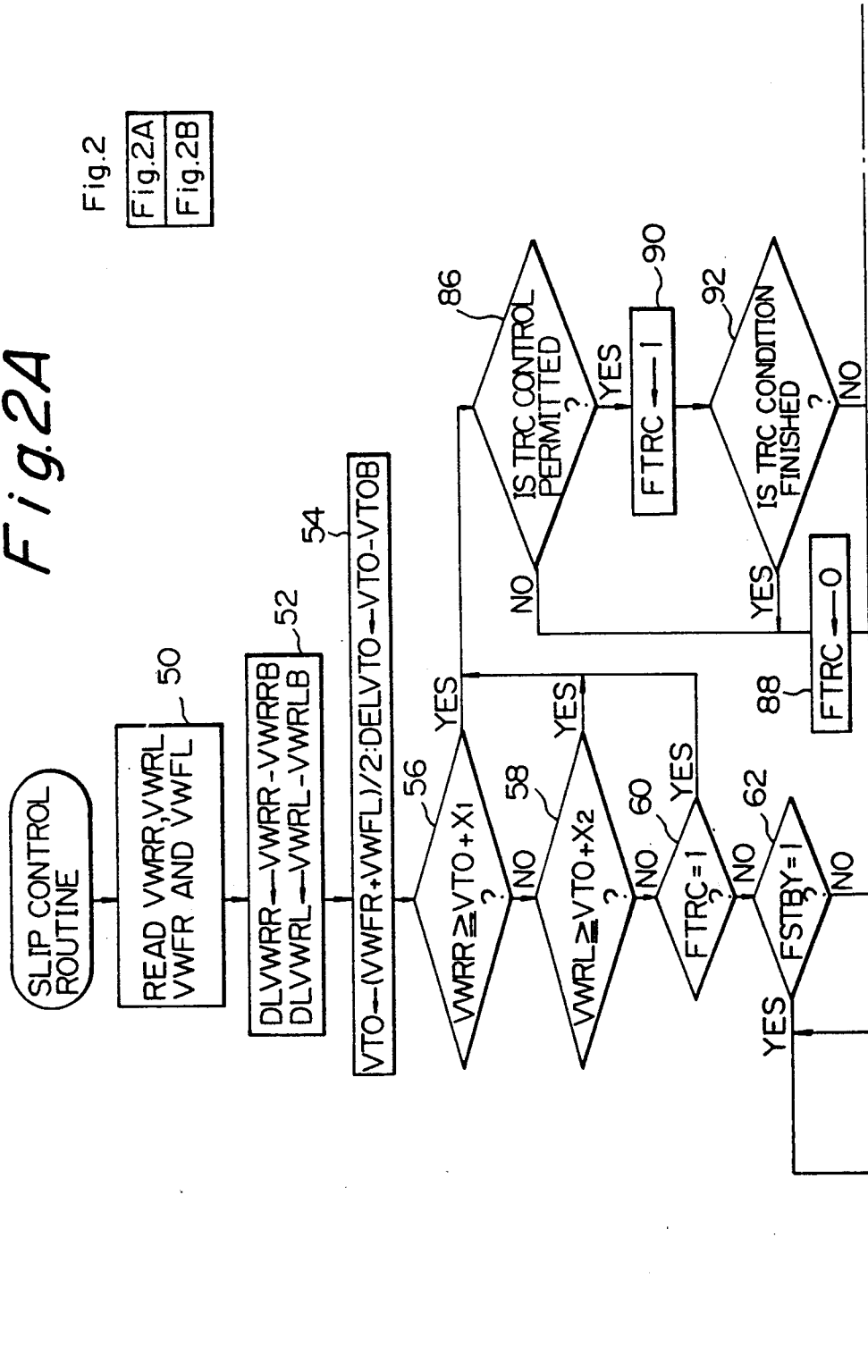

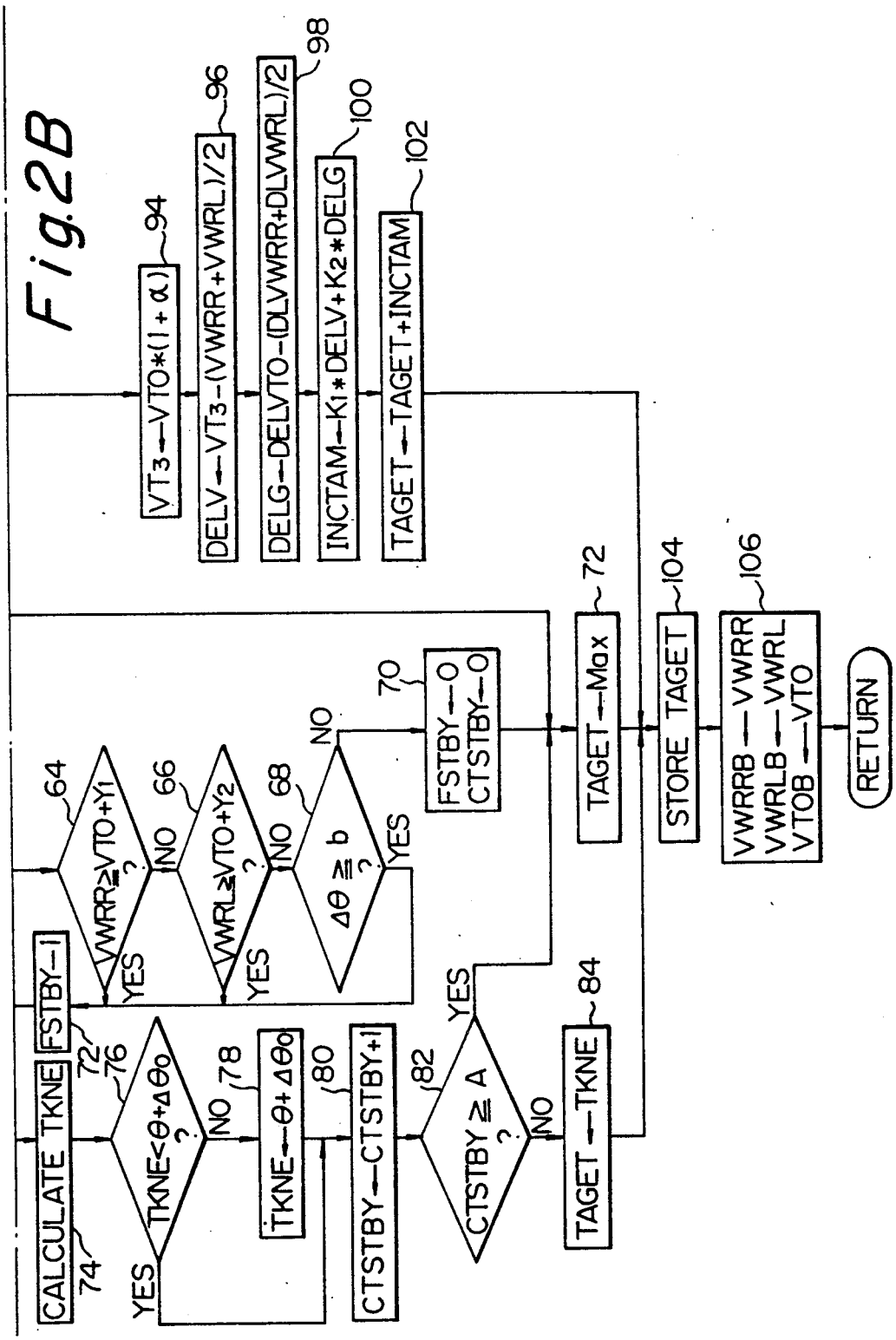

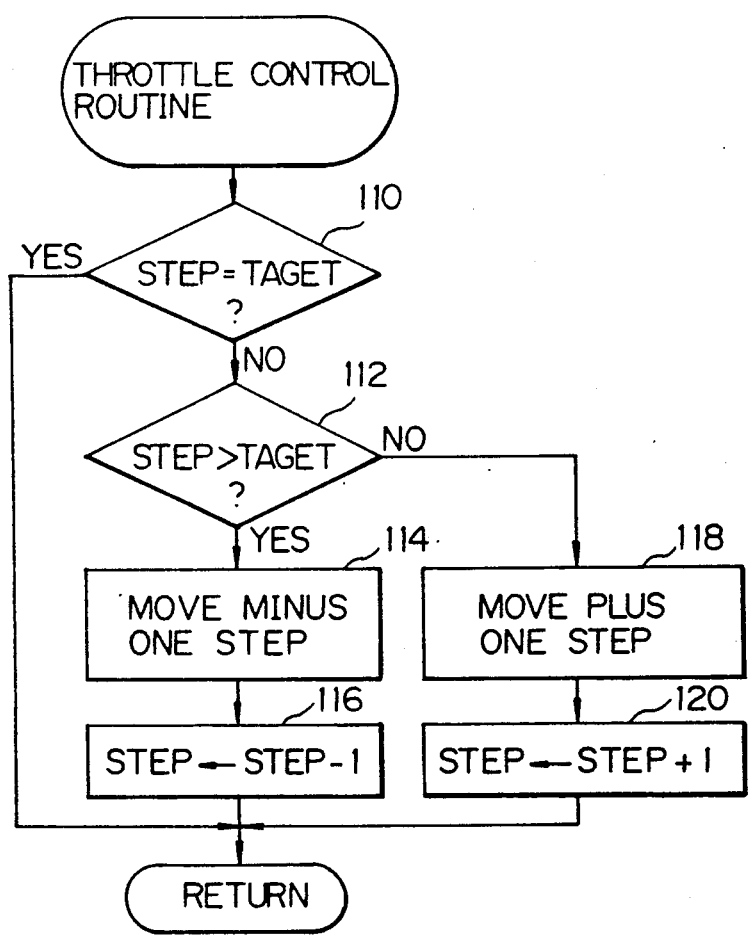

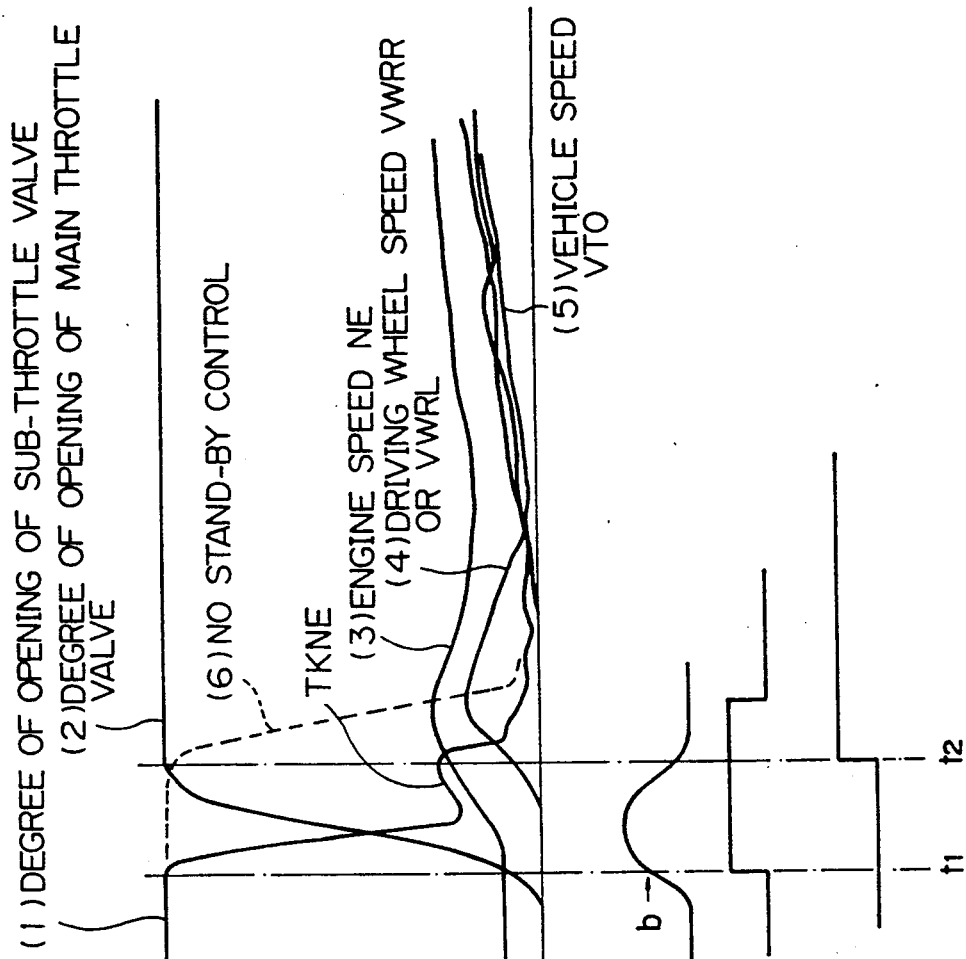

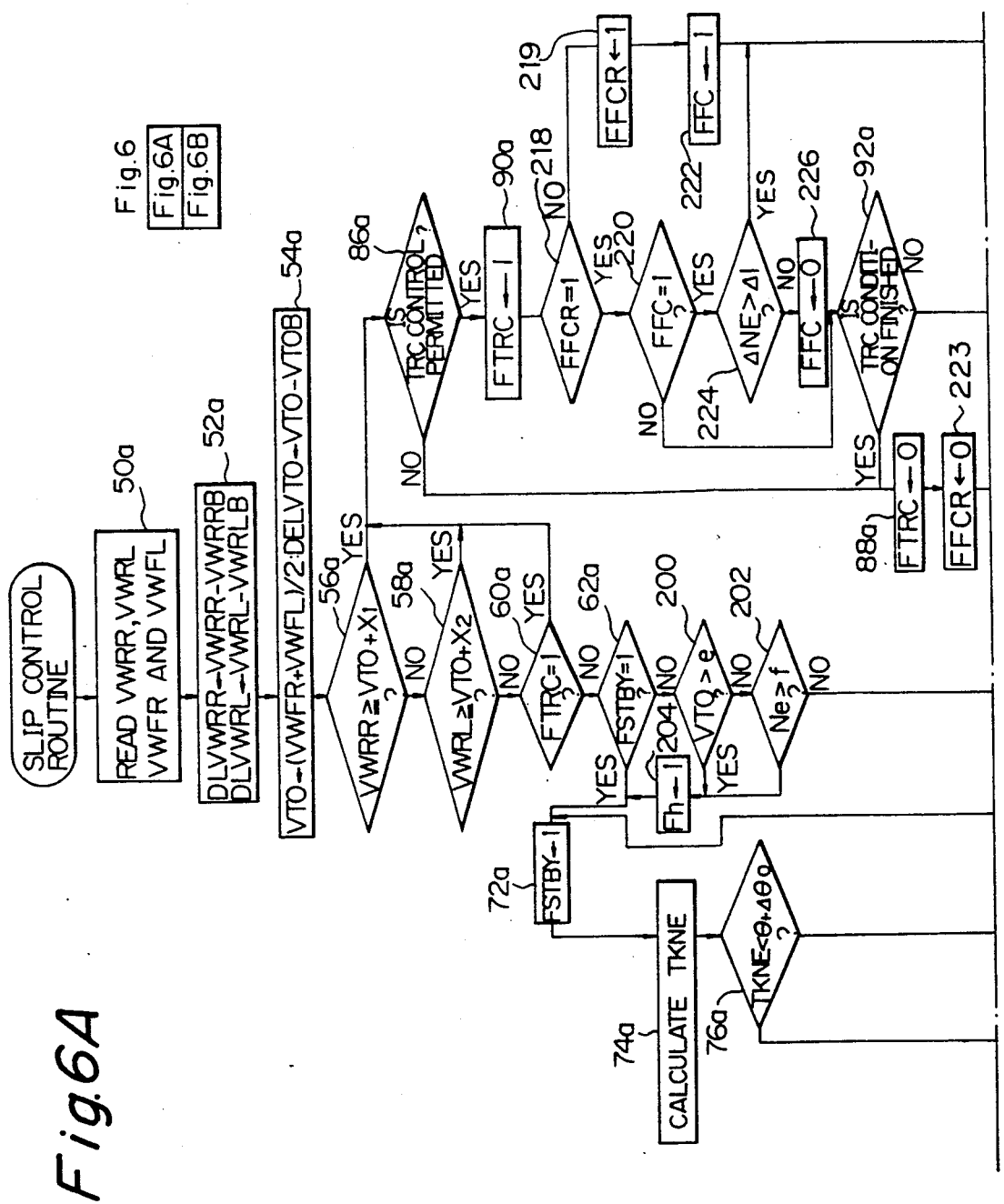

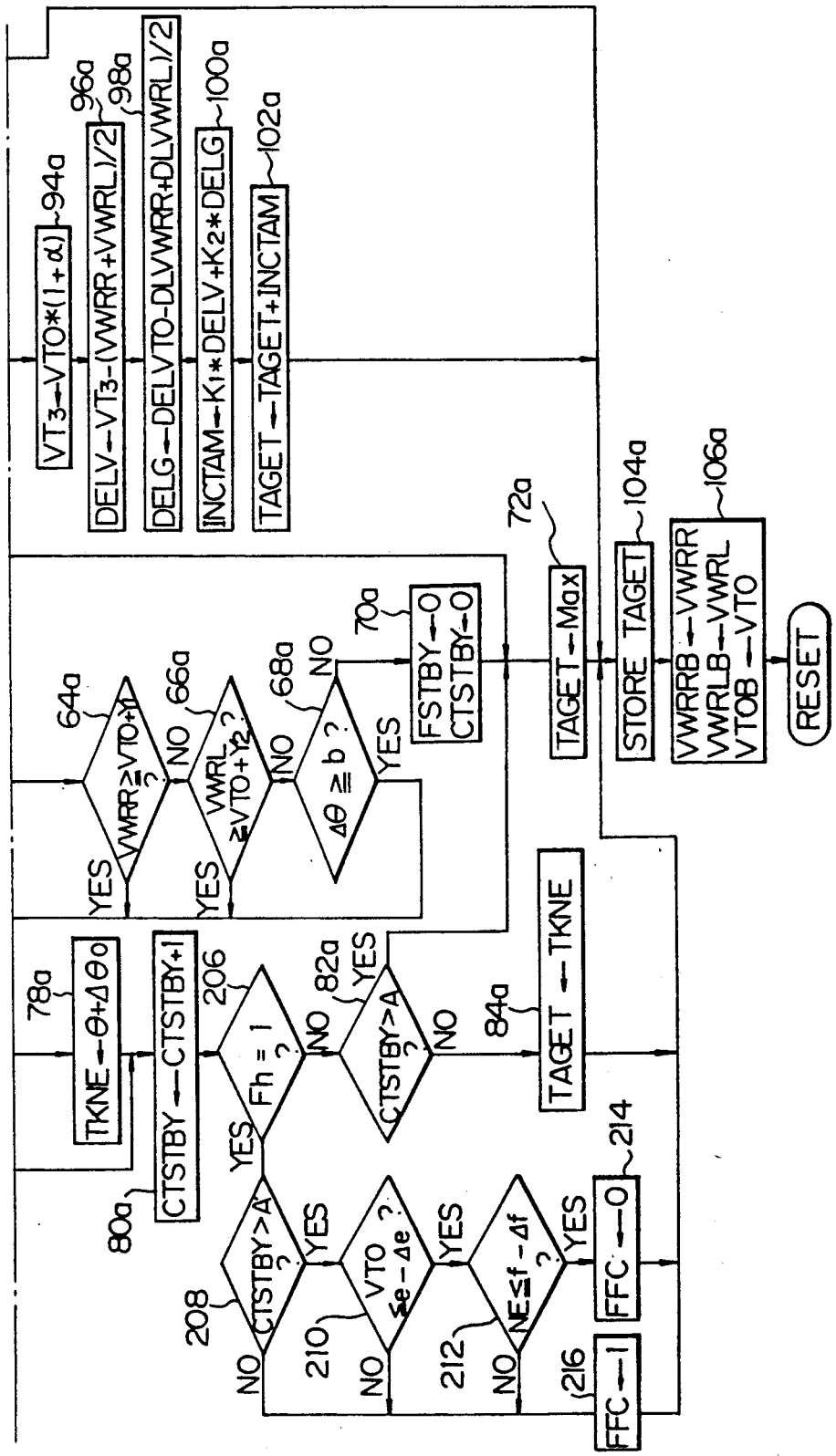

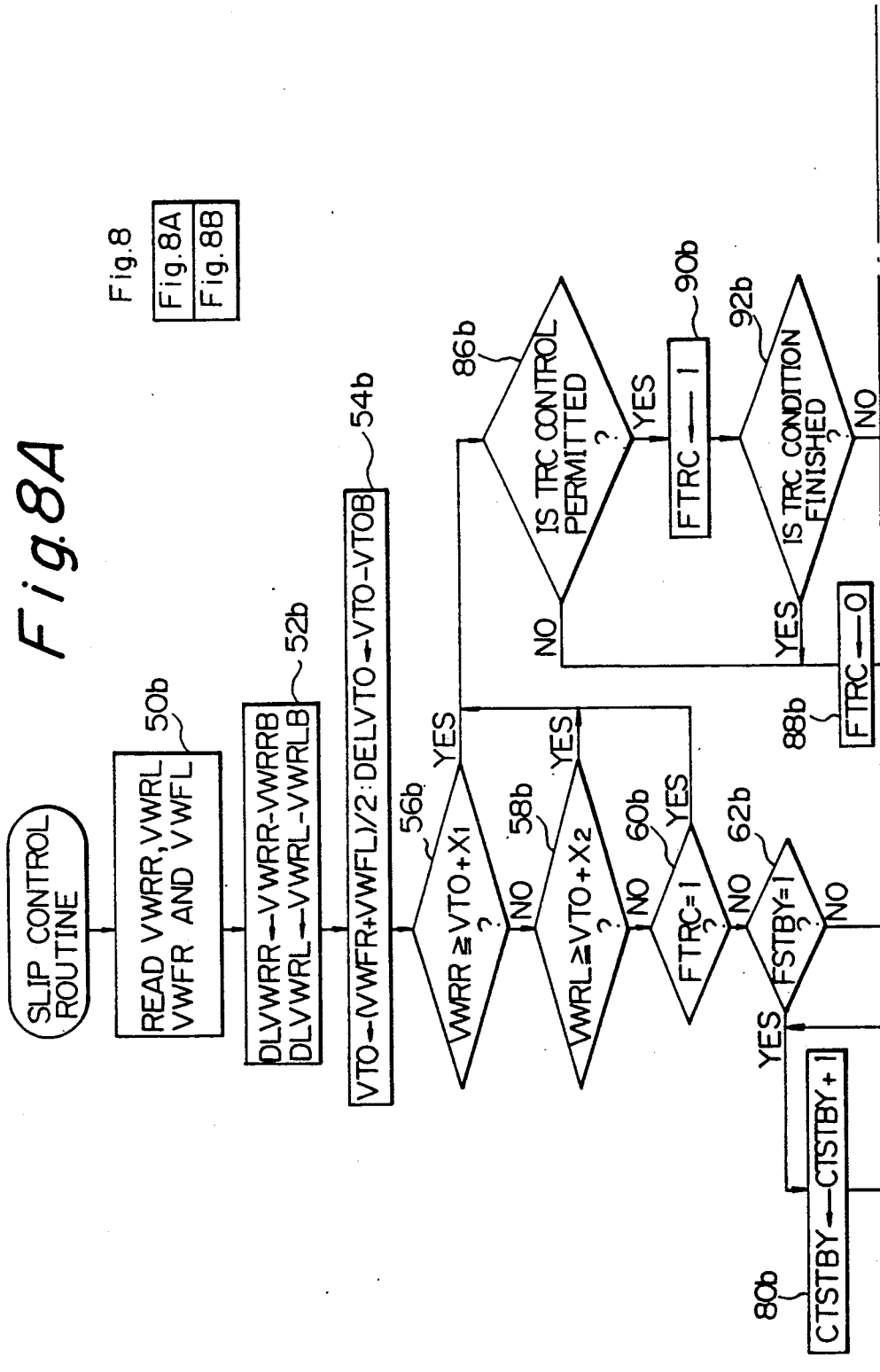

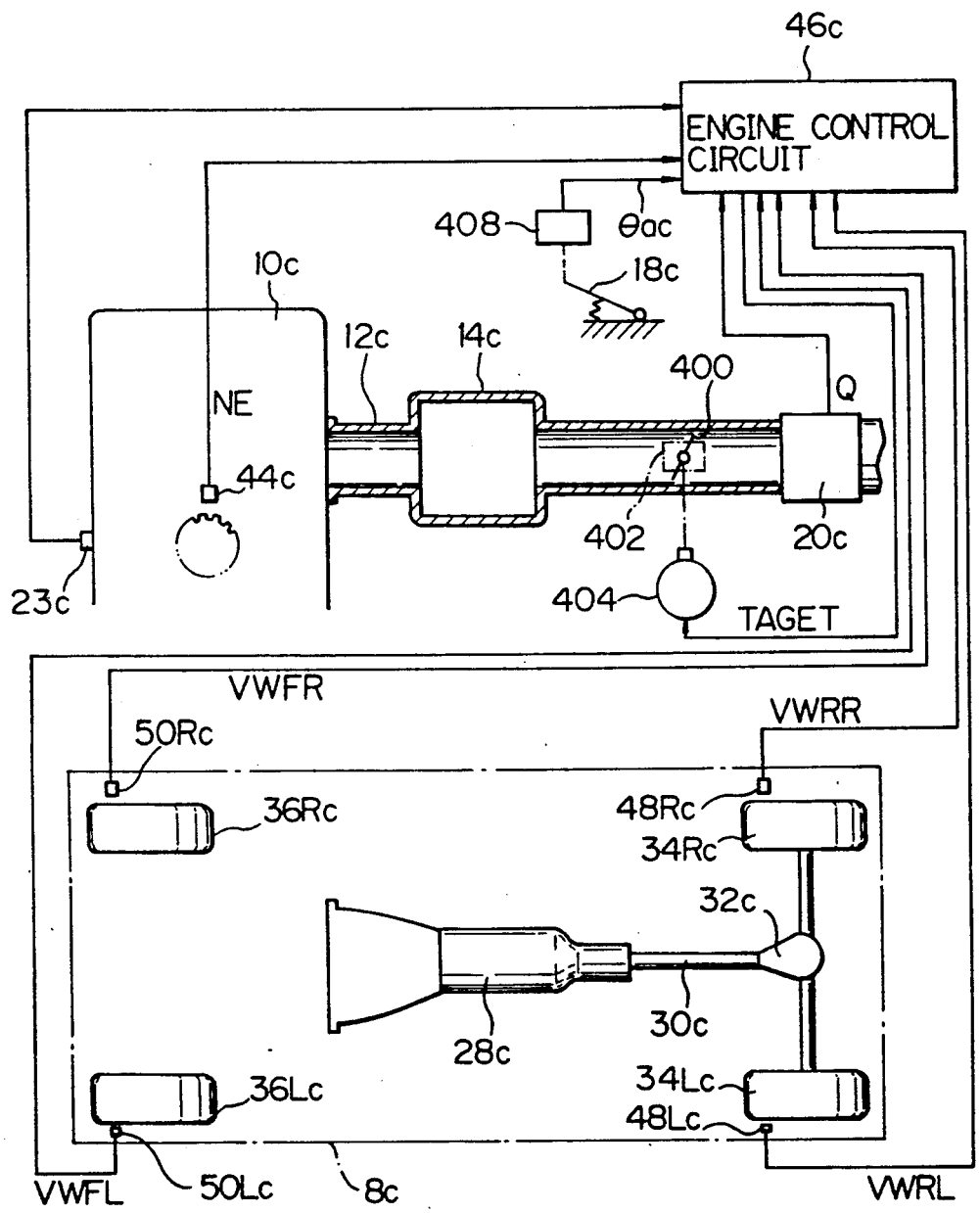

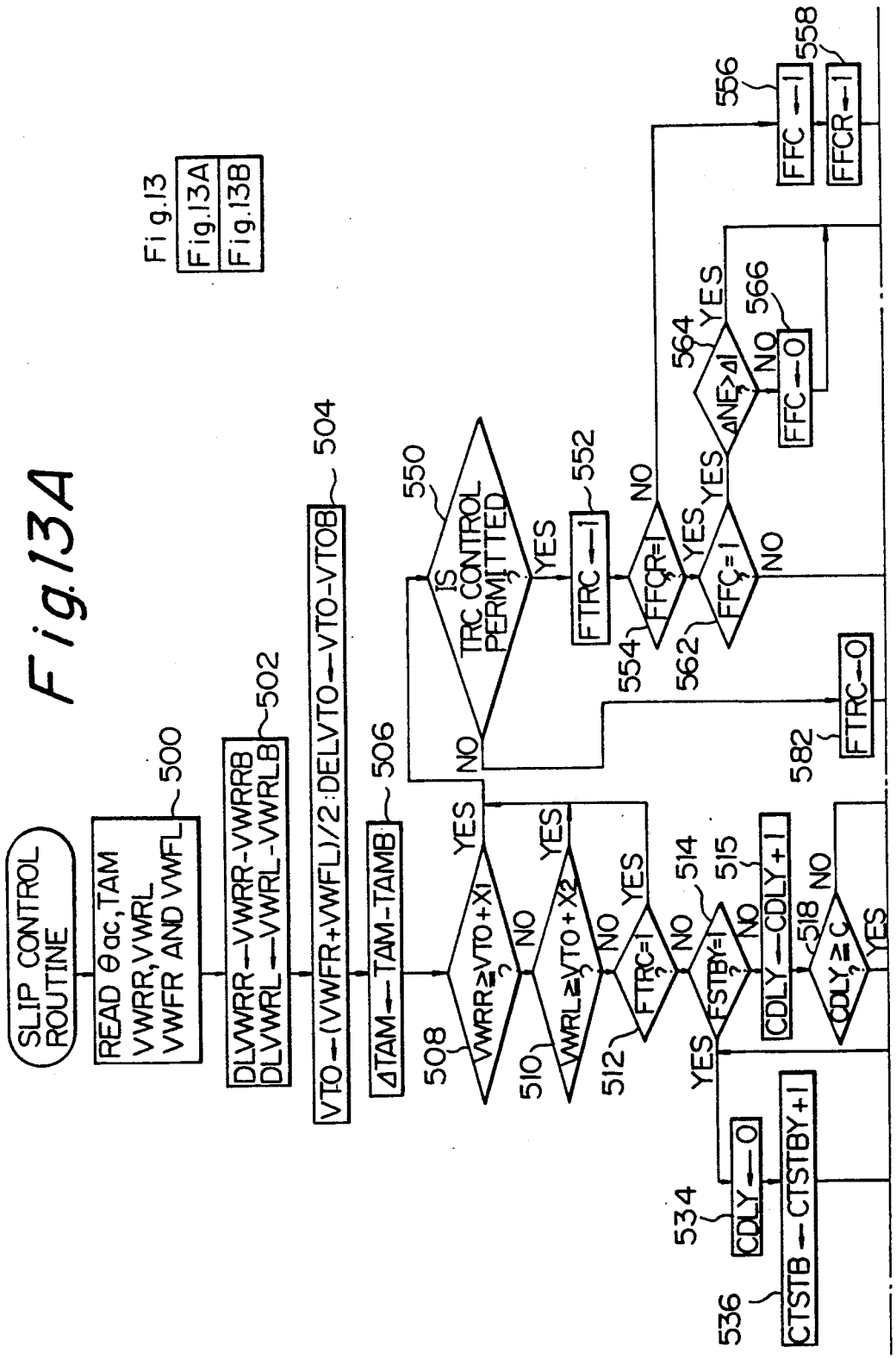

MAP FOR CALCULATION OF KTAM

TRACTION CONTROL SYSTEM FOR A VEHICLE WITH AN INTERNAL COMBUSTION ENGINE

BACKGROUND OF THE INVENTION

1. Field of the Invention

The present invention relates to an apparatus for controlling slip at drive wheels driven by an internal combustion engine.

2. Description of the Related Art

It is well known that slip is easily generated at the driving wheels of a vehicle provided with an high output power engine, when the vehicle is accelerated, because the engine output power is too high with respect to an adhesion force between the tires and the road surface whereby a grip of the tire is weakened. Therefore, a traction control system has been proposed, to prevent the generation of such a slip, wherein a sub-throttle valve is provided in an intake system of the internal combustion engine, which sub-throttle valve is operated independently of the depression of an accelerator pedal for controlling the amount of intake air, or wherein a throttle valve is constructed as a "link-less" type. In such a system, a slip is detected from a difference in a rotational speed of the driving wheels of the vehicle with respect to a rotational speed of the driven wheels, and the sub-throttle valve or link-less throttle valve is then closed to a degree of opening which is smaller than a degree of opening determined by the degree of depression of the accelerator pedal. As a result, the amount of intake air is reduced, and accordingly, the engine output torque is lowered, and thus the acceleration slip is controlled. See, for example, Japanese Unexamined Patent Publication No. 62-237047.

The sub-throttle valve is maintained at the fully open position during a normal operating period other than that wherein an acceleration slip is generated, so that a normal operation of the main throttle valve controlled by an accelerator pedal is not affected by the provision of the sub-throttle valve. This means that the sub-throttle valve is closed to a predetermined degree the instant the vehicle is accelerated, to prevent an acceleration slip. Nevertheless, since the sub-throttle valve is fully open just before the acceleration is commenced, a significant time is required before the sub-throttle valve can be closed to the predetermined degree. In particular, where an actuator for the sub-throttle valve is a stepper motor, to obtain a precise control of the opening of the degree of the sub-throttle valve, a quick movement of the sub-throttle valve to the desired position becomes much more difficult, due to a slow response speed characteristic inherent to the stepper motor.

Since the acceleration slip has a large value at the initial stage thereof, the traction control should be such that a large slip at the initial stage of the acceleration is effectively suppressed. In the prior art, as described above, the closing of the sub-throttle valve from a fully open condition to a desired degree of opening is commenced upon the detection of an acceleration slip, but a lengthy delay occurs in the closing of the sub-throttle valve, and therefore, the control of the engine output torque at the initial stage of the acceleration cannot be fully effected, and thus an ideal acceleration slip control cannot be obtained.

It would be easy to consider a control of the degree of the opening of the sub-throttle valve that will always conform to that of the main throttle valve, but this solution would result in a large torque at the step motor for operating the sub-throttle valve, which will damage the step motor after little use. Furthermore, there is some difficulty in controlling the sub-throttle valve to follow the main throttle valve while obtaining a traction control, and therefore, an ideal operation will not be always obtained, and thus an ideal acceleration slip control for reducing an excessive torque at the initial stage of the acceleration by a depression of the accelerator pedal cannot be obtained.

SUMMARY OF THE INVENTION

An object of the present invention is to provide a slip control device for a vehicle, which is capable of effectively controlling the acceleration slip while maintaining a good acceleration performance.

Therefore, according to the present invention, there is provided a vehicle comprising:

a vehicle body;

a pair of driving wheels mounted on the vehicle body;

a pair of driven wheels mounted on the vehicle body;

an internal combustion engine mounted on the vehicle body, an output shaft of the engine being connected to the driving wheels;

said internal combustion engine comprising an engine body, an intake line for forming a combustible mixture introduced into the engine body, an accelerator pedal having an operating relationship with the throttle means for controlling the degree of the opening of the throttle means, first throttle means for throttling the intake line for controlling an amount of combustible mixture introduced into the engine in accordance with a degree of depression of the accelerator pedal, and an exhaust line for removing a resultant exhaust gas from the engine body;

means for detecting a slip at said driving wheel when the vehicle is accelerated;

second throttle means for throttling the intake line for controlling an amount of the combustible mixture introduced into the engine, regardless of the degree of the depression of the accelerator pedal, when an acceleration slip is detected, for reducing the amount of the air-fuel mixture introduced into the engine in such a manner that the slip is controlled;

a slip prediction means for detecting a state wherein a slip at the driving wheels is likely to occur, from a running condition of the vehicle;

means for detecting an engine parameter related to the engine torque, and;

standby means for closing the second throttle means to a degree of opening corresponding to said detected engine parameter, prior to the occurrence of a predicted slip.

BRIEF DESCRIPTION OF THE DRAWINGS

FIGS. 2A, 2B and 3 are flowcharts illustrating the operation of the first embodiment of the present invention;

FIGS. 5(a) to 5(d) are timing charts illustrating the operation of the first embodiment of the present invention;

FIGS. 6A-6B are flowcharts of a slip control routine in a second embodiment of the present invention;

FIGS. 8A-8B are flowcharts of a slip control routine in a third embodiment of the present invention;

FIG. 12 schematically illustrates a vehicle provided with a slip control system according to the present invention, wherein the engine is a link-less throttle valve type;

FIG. 13A-13B are flowcharts of the slip control routine for the link-less throttle valve type of engine;

DESCRIPTION OF THE PREFERRED EMBODIMENTS

Figure 1:
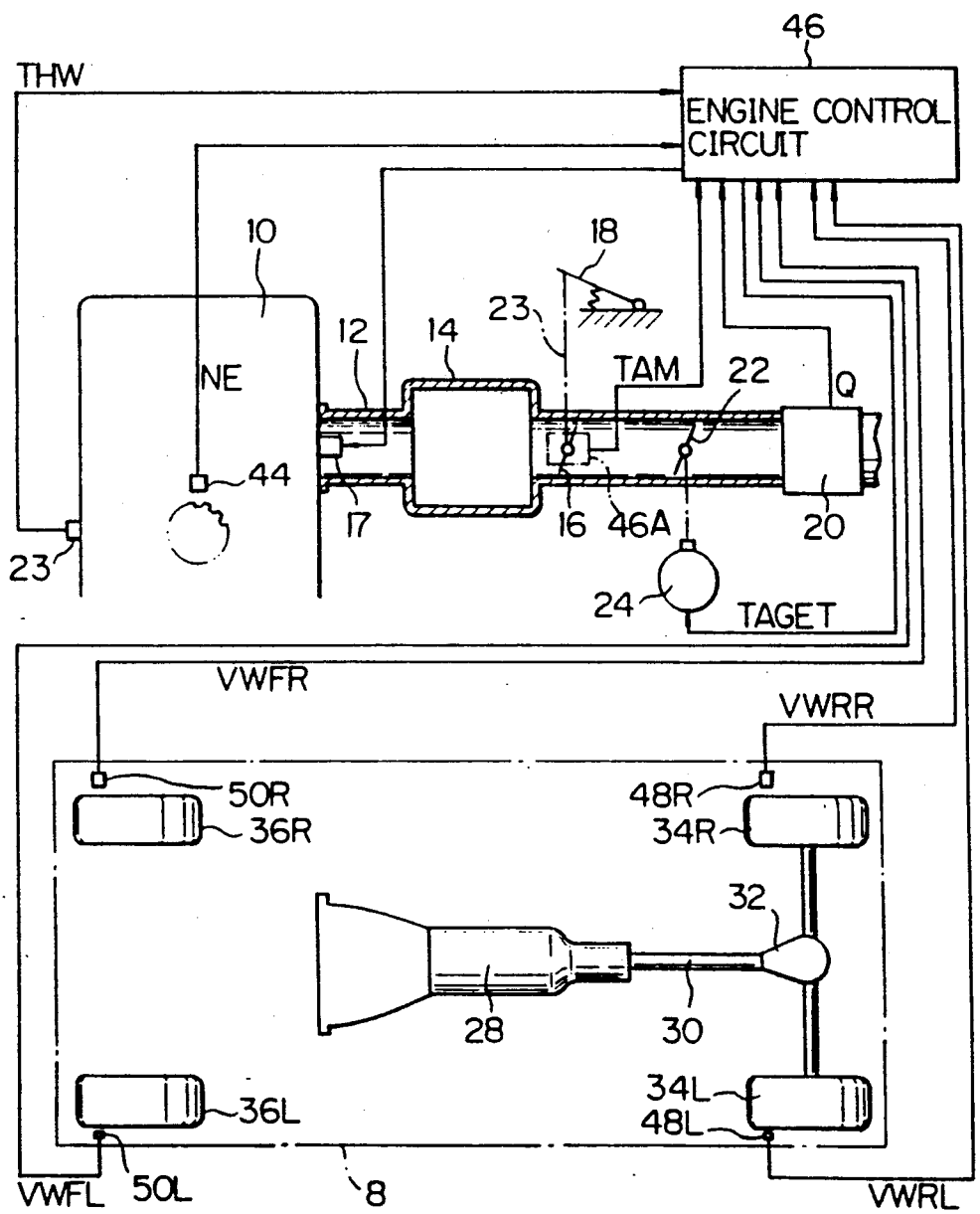
FIG. 1 schematically illustrates a vehicle provided with a slip control system according to the present invention.

FIG. 1 shows a schematic construction of an acceleration slip control system according to the present invention, wherein a sub-throttle valve connected to an actuator is provided so that the sub-throttle valve is operated independently of a main throttle valve operated by an accelerator pedal. In FIG. 1, 8 denotes an outline of a rear wheel drive type vehicle in which an internal combustion engine is provided; 10 denotes a body of an internal combustion engine; 12 is an intake pipe; 14 is a surge tank; 16 is a main throttle valve; 17 is a fuel injector; 18 is an accelerator pedal; 20 is an air-flow meter; and, 23 is an engine water temperature sensor. The main throttle valve 16 is mechanically connected to an accelerator pedal via a link-cable system, and the sub-throttle valve 22 is arranged in the intake passageway at a position upstream of the main throttle valve 16 and is connected to an actuator 24 such as a stepper motor. The actuator 24 is using for controlling a closing of the sub-throttle valve when the vehicle is accelerated. The engine 10 is provided with an output shaft connected to a transmission device 28, the output of which is connected, via a differential gear 32, to driving wheels 34R and 34L. Reference numerals 36R and 36L are driven wheels.

An engine control circuit 46 is used for controlling an engine operating parameter control, such as a fuel injection control, which will not be explained in detail since it is not directly related to the present invention, and for controlling the sub-throttle valve 22 in the first embodiment. To execute this control, the control circuit 46 is connected by various sensors; i.e., an engine rotational speed sensor 44 for generating a signal NE indicating an engine speed; a throttle sensor 46A for detecting the degree TAM of opening of the throttle valve 16, a pair of driving wheel speed sensors 48R and 48L mounted to face the right and left driving wheels 34R and 34L as vehicle rear wheels, respectively, for detecting the rotating speeds VWRR and VWRL of the driving wheels 48R and 48L, respectively, and a pair of driven wheel sensors 50R and 50L arranged to face the driven wheels 36R and 36L as vehicle front wheels, respectively, for detecting the rotational speeds VWFR and VWFL of the driven wheels 36R and 36L, respectively.

An operation of the first embodiment of the control circuit 46 will be described with reference to FIGS. 2 and 3. This routine is carried out at predetermined short intervals. At step 50, measured values of the speeds VWRR and VWRL of the right and left rear wheels as driving wheels and the speeds VWFR and VWFL of the right and left front wheels as driven wheels, by the sensors 48R and 48L, and 50R and 50L, respectively, are read out, and at step 52, a difference DLVWRR of the speed of the right rear wheel speed VWRR of this timing from the right rear wheel speed VWRRB obtained at the preceding timing, i.e., $$DLVWRR = VWRR - VWRB,$$

is calculated, and a difference DLVWRL of the speed of the left rear wheel speed VWRL of this timing from the left rear wheel speed VWRLB obtained at the preceding timing, i.e., $$DLVWRL = VWRL - VWRLB,$$

is calculated. At the following step 54, an average value VTO of the right front wheel speed VWFR and left front wheel VWFL, i.e., $$VTO = (VWFR + VWFL)/2$$

is calculated. This is an estimated speed of the vehicle. Then, a difference DELVTO of a vehicle mean speed VTO at this timing, from a speed VTOB obtained at the preceding timing, i.e., $$DELVTO = VTO - VTOB$$

is calculated.

At step 56, it is determined if the speed VWRR of the right rear driving wheel is equal to or larger than $VTO + X_1$, and at step 58 it is determined if the speed VWRL of the left rear driving wheel is equal to or larger than $VTO + X_2$. $X_1$ and $X_2$ are predetermined values, respectively. If one of the above equations is satisfied, the speed of the driving wheel is high enough to determine that a slip has occurred at the driving wheels.

When it is determined that there is no slip (no result at the steps 56 and 58), the routine goes to step 60 where it is determined if a flag FTRC is set (1). This FTRC is set (=1) when a slip control is carried out, and is reset (=0) when slip control is not carried out. When it is determined that the slip control is not carried out (FTRC=0), the routine goes to step 62 where it is determined that a standby flag FSTB is set (1). The FSTB is set (=1) when a standby control is carried out and is reset (=0) when the standby control is not carried out. The standby control refers to an operating condition wherein a slip at the wheels is likely to occur is predicted, and the sub-throttle valve is closed to a position at which the slip is controlled. When the FSTBY has an initial value (0) the routine goes to steps 64, 66, and 68, at which engine operating conditions wherein the acceleration slip is likely to occur are detected. At step 64, it is determined if the value of the right driving wheel speed VWRR is larger than the estimated vehicle speed VTO plus a predetermined value $Y_1$, which is smaller than the predetermined value $X_1$ at step 56, and at step 66 it is determined if the value of the left driving wheel speed VWRL is larger than the estimated vehicle speed VTO plus a predetermined value $Y_2$, which is smaller than the predetermined value $X_2$ at step 58. Then, at step 68, it is determined if a difference $\Delta\theta$ of the degree of throttle opening at this timing, with respect to that obtained at the preceding timing when executing this routine, is larger than a predetermined value b. When all of the results at steps 64, 66 and 68 are No, i.e., the VWRR is smaller than VTO plus $Y_1$, the VWRL is smaller than the VTO plus $Y_2$, and $\Delta\theta$ is smaller than the predetermined value b, it is considered that the vehicle is not under a condition wherein slip is likely to occur, and thus the routine goes to step 70 and the stand-by flag is reset (0), and a counter CSTBY for counting the time for the stand-by control is cleared. At step 72, the maximum value Max is moved into TAGET, which is a target position of the step motor 24 for operating the sub-throttle valve 22. When the TAGET is set to Max, the sub-throttle value 16 is fully open, and therefore, the stand-by control of the sub-throttle valve 22 is cancelled.

When any one of the conditions (stand-by condition) at steps 64, 66 and 68 is obtained, it is considered that the vehicle is in a condition wherein an acceleration slip will easily occur, and the routine goes from step 64, 66 or 68 to step 72 and the stand-by flag FSTBY is set (1). At step 74, a stand-by control opening TKNE of the sub-throttle valve 22 is calculated in accordance with the engine speed NE. The stand-by control opening TKNE is determined in such a manner that the sub-throttle valve 22 has the maximum degree of opening value which will not noticeably lower the engine output torque. Thus, the value of the stand-by opening in this embodiment is determined in accordance with the engine speed NE in such a manner that, the smaller the degree of throttle opening, the smaller the degree of the stand-by opening.

Figure 4A:
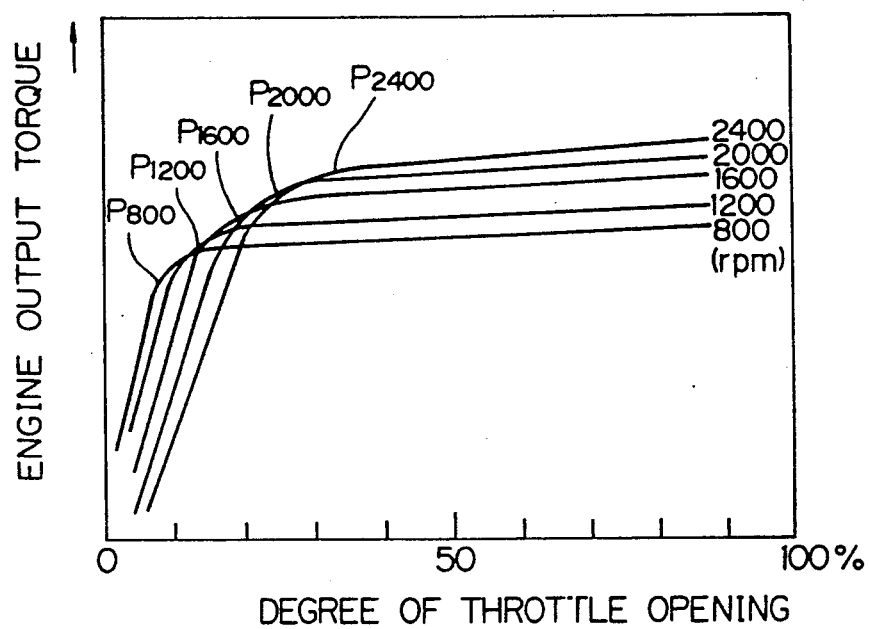
FIG. 4(a) shows a relationship between the degree of opening of the main throttle valve and the engine output torque at various engine speed values.

In FIG. 4(a), the abscissa is the degree of opening of the main throttle valve 16 and the coordinate is the engine output torque. FIG. 4(a) shows curves indicating the relationships between the degree of opening of the throttle valve designated engine speed values As will be easily seen, each of the curves has a critical point $P_{800}$, $P_{1200}$, $P_{1600}$, $P_{2000}$, or $P_{2400}$ at which the engine torque is sharply lowered. The throttle opening values at these critical points are lowered in accordance with a reduction of the engine speed. To conform to this characteristic shown in FIG. 4(a), the stand-by opening is determined along the line in FIG. 4(b).

At step 76, it is determined if the target stand-by opening degree TKNE is smaller than the degree of the opening $\theta$ of the main throttle valve 16 plus a predetermined value $\Delta\theta_0$. When TKNE$\geq\Delta\theta+\theta_0$, the routine goes to step 78 and $\theta+\theta_0$ is moved to the TKNE. This means that the target value TKNE of the sub-throttle valve 22 is that calculated at step 74 in accordance with the engine speed NE when the degree of the opening of the sub-throttle valve 22 is small enough with respect to the opening of the main throttle valve 16, such that the engine torque is fully lowered to suppress the slip. Furthermore, as the target value of the degree of the opening of the sub-throttle valve 22 $\Delta\theta+\theta_0$ is used in place of the TKNE calculated at the step 74, when the degree of the opening of the sub-throttle valve 22 is too large with respect to the opening of the main throttle valve 16, the lowering of the engine torque will not be enough to suppress an acceleration slip.

At step 80, a counter CTSTBY is incremented, and at step 82 it is determined if the value of CTSTBY is larger than a predetermined value A corresponding to a predetermined time lapse at the stand-by control. When it is determined that the CTSTB is smaller than the predetermined value A, the routine goes from step 82 to step 84 and the TKNE is moved to TAGET, whereby the degree of opening of the sub-throttle valve 22 is controlled to the stand-by value calculated at step 74 in accordance with the engine speed NE. If the value of the counter CSTBY is larger than A at step 82, a stand-by condition has continued for a relatively long time without an actual slip at the vehicle wheels, and therefore, it is considered that a slip will not occur because the road surface has a high friction coefficient. Therefore, the routine goes to the step 72 and the Max is moved to the TARGET, whereby the sub-throttle valve 22 is fully open and the stand-by operation is cancelled.

When any one of the requirements at steps 56, 58 and 60 is obtained, it is considered that an acceleration slip has actually occurred, and therefore, the routine goes to step 86 and it is determined if the traction control operation can be executed. When a control failure operation, for example, is carried out, the execution of the TRC control is permitted and the routine goes from step 86 to step 88, where the traction control flag FTRC is cleared, and to step 72 to obtain a fully open position of the sub-throttle valve 22.

When the TRC control is permitted the routine goes from step 86 to step 90, where the traction control flag FTRC is set (1), and to step 92 where it is determined if a traction control condition has been obtained. For example, when the degree of opening of the sub-throttle valve 22 is larger than the degree of opening of the main throttle valve 16, the TRC control must be terminated, and therefore, the routine goes to steps 88 and 72 for cancelling the traction control.

When the TRC control must be continued the routine goes from step 92 to step 94, where a target vehicle speed VT3 is calculated by the following equation, $$VT3 = VTO \times (1+\alpha),$$

where $\alpha$ is a slip factor determined such that a maximum adhesion of the tires at that vehicle speed is obtained. At step 96, a first order deviation DELV is calculated by the following equation $$DELV = VT3 - (VWRR + VWRL)/2,$$

where DELV is the target vehicle speed VTO subtracted by average speed of the driving wheels. DELV indicates a difference of the target speed of the driving wheels from the actual speed of the driving wheels, as the first order deviation to be controlled. At step 98, a second order deviation DELG is calculated by the following equation, $$DELG = DELVTO - (DLVWRR + DLVWRL)/2,$$

where DELG is the vehicle speed change amount DELVTO per unit time obtained at step 54 and subtracted by a mean value of the driving wheel speed change amount per unit time. DELG indicates a rate of change in a control deviation, i.e., the control deviation is increasing or decreasing. At step 55, a control amount INCTAM in the control signal for operating the sub-throttle valve 22 is calculated by the following equation, $$INCTAM = K_1 \times DELV + K_2 \times DELG,$$

where $K_1$ and $K_2$ are feedback gains. At step 102, the target opening degree TAGET of the sub-throttle valve 22 is calculated by $$TAGET = TAGET + INCTAM,$$

which equation shows that the degree of opening of the sub-throttle valve is controlled by both a large value of the control deviation (DELV) and a rate of change in the deviation (DELG).

After the target value of the opening of the sub-throttle valve 22 is obtained at steps 70, 84 or 102, the routine goes to step 104 and the target value is stored to a RAM area, and to step 106 where VWRR, VWRL, and VTO are moved to VWRRB, VWRLB, and VTOB, respectively, for the execution of the routine in FIG. 2 at the following timing.

FIG. 3 shows a routine for controlling the actuator 24 as a stepper motor, for controlling the sub-throttle valve 22 to the target opening TAGET obtained at step 104 in FIG. 2. This routine is carried out at predetermined intervals sufficient to obtain a one step rotation of the step motor 24. At step 110, it is determined that the actual position of the step motor 24, STEP corresponds to the target position TAGET. If STEP is equal to TAGET, the following steps are by-passed, but when STEP is not equal to the TAGET, the routine goes from step 110 to step 112, where it is determined if STEP > TAGET. When a condition STEP > TAGET is obtained, it is considered that the step motor 24 is at a position in which it has been rotated past the target position. In this case, the routine goes to step 114 and a one step rotation of the step motor 24 in the reverse direction is carried out. Then, at step 116, STEP is decremented. When a condition STEP < TAGET is obtained at step 112, it is considered that the step motor 24 is at a position in which it has been rotated short of the target position. In this case, the routine goes to step 118 and a one step rotation of the step motor 24 in the forward direction is carried out. Then, at step 120, STEP is incremented.

Figure 4B:
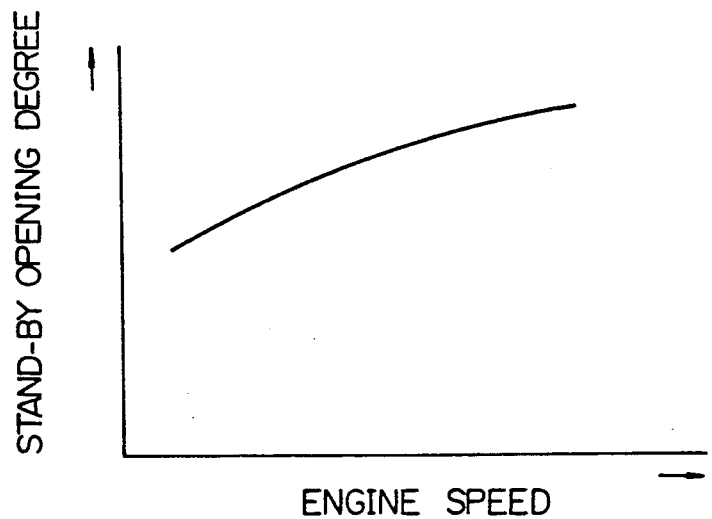
FIG. 4(b) shows a relationship between the engine speed and the degree of opening of the sub-throttle valve during a stand-by operation.

FIG. 5(a) shows curves indicating the changes in various parameters with an elapse of time from the commencement of the acceleration, i.e., (1) a degree of opening of the sub-throttle valve 22, (2) a degree of opening $\theta$ of the main-throttle valve 16, (3) an engine speed NE, (4) a driving wheel speed VWRR or VWRL, and (5) a vehicle speed VTO. At a time $t_1$, when a stand-by condition is obtained because the throttle opening change rate $\Delta\theta$ larger than the threshold value b (step 68) as shown in FIG. 5(b), the flag FSTBY is set (1) as shown by FIG. 5(c) so that the sub-throttle valve 22 is closed to the degree of the opening of TKNE (step 74) determined in accordance with the engine speed NE as shown by FIG. 4(b). Then, at a time $t_2$, an occurrence of slip is detected from the driving wheel speed with respect to the vehicle speed, and the flag FTRC is set (1) to commence the traction control. It should be noted that the dotted line (6) shows a change in the degree of opening of the sub-throttle valve 22 when the stand-by control according to the present invention is not carried out, wherein the closing of the sub-throttle valve is delayed and thus a quick control of the slip cannot be obtained.

FIG. 6 shows a slip control routine in a second embodiment of the present invention. A feature of this system is that a fuel cut operation is carried out when a slip occurs at the driving wheels. Basically, such a system is known, for example, from Japanese Unexamined Patent Publication No. 60-104730. A lowering of an engine output torque is carried out not only in the traction control process but also in the fail safe process, such that a vehicle speed becomes higher than a predetermined upper limit or an engine speed becomes higher than a predetermined upper limit. A lowering of an engine torque can be easily made merely by executing a fuel cut operation, but when a fuel cut operation is combined with the slip control operation, an excessive increase in a voltage may be applied to an ignition device, and thus the operating life of the ignition device is quickly shortened, for reasons which will be described later. A large slip of the wheels with respect to the road surface, at which a traction control is required, generally occurs when the operator sharply and fully depresses an accelerator pedal to obtain a large degree of opening of the main throttle valve 16, and a vehicle speed or engine speed high enough to allow an emergency fuel cut operation to be carried out also requires a large degree of opening of the main throttle valve 16. In such a condition wherein the throttle valve is wide open, a large amount of air is introduced into the engine cylinders, to obtain an intake pressure higher than that obtained at a usual condition wherein the degree of the opening of the main throttle valve 16 has a medium value due to a lightly depressed accelerator pedal. When a fuel cut operation is carried out at a high value of the intake pressure, a voltage level applied to the ignition device is increased by 3 to 5 kV with respect to the normal voltage at a level of, e.g., 25 kV. Such an additional increase in the voltage level of the ignition device caused by the fuel cut operation, when the accelerator pedal is depressed to increase the pressure level in the engine cylinder, causes an excessive increase of the voltage applied to the ignition device, compared to a usual operating condition. This will considerably shorten the operating life of the ignition device if special consideration is not given to the design of the ignition device with regard to the high voltage which might be applied thereto, but this will increase the cost of manufacturing the ignition device.

In this second embodiment of the present invention, to overcome this difficulty there is provided a means for reducing the degree of the throttle opening prior to the execution of the fuel cut operation. To realize this concept, prior to the fuel cut operation upon an occurrence of slip at the vehicle wheel, the stand-by control as a way of lowering the engine intake pressure, as explained with reference to the first embodiment in FIG. 6, is carried out, and as a result, an increase in the voltage generated in the ignition device is prevented because the effect of the fuel cut operation and an increase of the voltage of the ignition device is cancelled by the effect of the lowering of the intake pressure by closing the sub-throttle valve by the stand-by operation. The second embodiment of the present invention based on this concept will be more fully explained with reference to FIG. 6, in the points which are basically different from FIG. 2. Steps the same as those in FIG. 2 of the first embodiment are designated by the same reference numeral, with a suffix a added for discrimination.

As in the first embodiment, an occurrence of slip is determined at steps 56a and 58a, and when slip does not occur (no result at steps 56a and 58a) or the slip control is not carried out (no results at step 60a) the process goes to a stand-by routine following step 62a. Steps 200, 202 and 204 are used for determining the need for an emergency fuel cut operation, as described later. A stand-by control area is determined by executing steps 64a, 66a and 68a to set a stand-by flag FSTB when the vehicle is in the stand-by control area. Steps 74a, 76a, 78a, 80a, 82a and 84a are a routine for carrying out a stand-by control for closing the sub-throttle valve 22 to a position determined by TKNE in accordance with the engine speed prior to the execution of the slip control, as in the first embodiment. Also, as in the first embodiment, the stand-by control is cancelled when a slip does not occur before a predetermined time (determined by CSTBY) has lapsed from the start of the stand-by control (yes result at step 82a). Steps 208 to 216 show the emergency fuel cut operation, which will fully described later.

A yes result at step 56a, 58a or 60a means that the vehicle is in the TRC mode, and therefore, the TRC control is carried out to enter a routine following steps 86a and 90a. At step 218, it is determined if a flag FFCR is set. Initially, the FFCR=0 (step 223), then the routine goes to step 219 to set the FFCR, then to step 222 where a flag FFC is set so that a fuel cut operation is carried out to stop a supply of fuel to the engine and lower an engine torque, as described later. When the FFCR is set at step 218, the routine goes to step 220 where it is determined if the FFC is set. At the following timing, since the FFC is set, the routine goes from step 220 to step 224, where it is determined if a difference ΔNE of an engine speed NE obtained at this timing, from that obtained at the preceding timing, is larger than a predetermined amount Δ1. When a predetermined amount of a change in the engine speed is obtained, the routine following step 226 is by-passed. When a predetermined amount of change Δ1 of the engine speed is not obtained, the routine goes to step 226 to clear the fuel cut flag FFC and cancel the fuel cut operation, and to a routine following step 92a, which is similar to the routine in FIG. 2. A target speed VT3 is calculated at step 94a, a first order control deviation DELV and a second order control deviation DELG are calculated at step 98a, a feedback control amount INTCAM is calculated at step 100a, and a target amount TAGET of the degree of opening of the sub-throttle valve 22 is calculated at step 102a.

The second embodiment of FIG. 6 further includes a routine for carrying out an emergency fuel cut operation regardless of the occurrence of wheel slip when the vehicle speed or engine speed is extremely high. This routine is constructed by steps 200 to 216. The steps 200 and 202 are executed when a slip control is not carried out (no result at step 60a), and the stand-by operation is not carried out (no result at step 62a). When the vehicle speed VTO is larger than a predetermined lower limit value e for commencing an emergency fuel cut operation, or when the engine speed NE is larger than a predetermined lower limit value f for commencing an emergency fuel cut operation, the routine goes to step 204 and the flag Fh is set (1). When the flag Fh is cleared, i.e., the engine is not under the emergency fuel cut operation, the routine at step 206 flows to the routine following step 82a, so that the stand-by operation as described with reference to FIG. 2 is executed. Namely, the sub-throttle valve is controlled to a target value of the opening TKNE for a predetermined period corresponding to the number of the counter CSTBY, from the commencement of the TRC control (step 84a), and the stand-by control is stopped when no slippage occurs during this period (yes result at step 82a).

Contrary to this, when the flag Fh is set, i.e., the engine is under the emergency fuel cut operation, the routine at the step 206 flows to the routine following step 208, to execute an emergency fuel cut operation. At step 208, it is determined if the value of the counter CSTBY is larger than a predetermined value A' obtained when an emergency fuel cut is required (a first time yes determination at step 200 or 202), which corresponds to a time necessary to lower the intake pressure value at the engine cylinders to a predetermined value at which a predetermined low ignition requirement voltage is maintained. When it is determined that CSTBY≦A', i.e., a predetermined time has not yet elapsed, the routine following step 120 is by-passed. When it is determined that CSTBY>A', i.e., a predetermined time has elapsed, the routine goes to step 210 and it is determined if the vehicle speed VTO is equal to or lower than the threshold value e obtained at step 200 and subtracted by a predetermined value Δe. At step 212 it is determined if the engine speed NE is equal to or lower than the threshold value f obtained at the step 202 and subtracted by a predetermined value Δf. When it is determined that VTO>e−Δe, i.e., the vehicle speed is still not lowered, or NE>f−Δf, i.e., the engine speed is still not lowered, the routine goes to step 216 and the fuel cut flag FFC is set (1) to allow a fuel cut operation to take place, as described later. When it is determined that VTO≦ and NE≦f−Δf, i.e., there is a sufficient lowering of the vehicle speed VTO and the engine speed NE, the routine goes to step 214 to clear the flag FFC, and the fuel cut operation is stopped.

Figure 7:
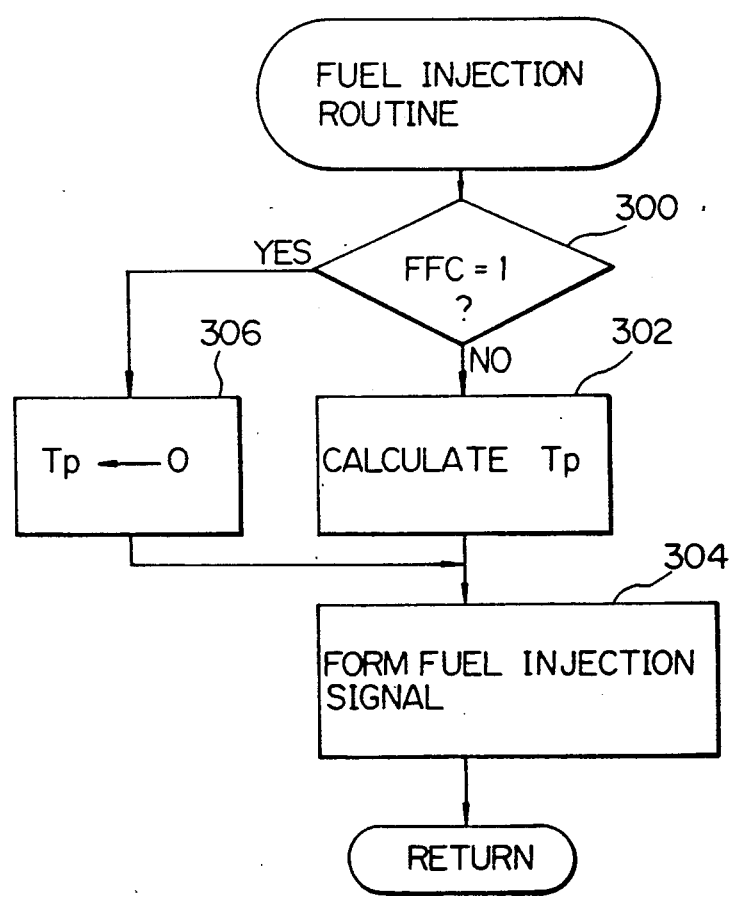
FIG. 7 is a flow chart of a fuel cut routine.

FIG. 7 shows a fuel injection routine which is commenced at the timing of each fuel injection by the fuel injectors 17 at the respective cylinders. This timing occurs at every 180 degrees of crank angle when the engine is a four cylinder type. At step 300, it is determined if the fuel cut flag FFC is set (1). When the flag FFC is 0, the routine goes to step 302 and the fuel injection amount Tp is calculated to match the engine operating condition. At step 304, a fuel injection signal is supplied to the fuel injector 17 of a designated cylinder, for executing a fuel injection of a calculated amount of fuel. When it is determined that the flag FFC is set, the routine goes from step 300 to step 306 and a zero value is moved to Tp, whereby the fuel injection is stopped.

As is clear from the above description, according to this second embodiment, prior to the fuel cut operation (steps 220 to 226) for lowering the engine output torque to suppress wheel slip upon acceleration, or prior to the fuel cut operation (steps 210 to 216) for preventing an excessive increase of the engine speed or vehicle speed, the degree of opening of the throttle valve (sub-throttle valve 22) is reduced by executing the stand-by routine (steps 74a to 84a). As a result of the closing of the throttle valve, the intake pressure in the intake passageway of the engine is lowered prior to the execution of the fuel cut operation, and thus an increase in the voltage supplied to the ignition device is prevented.

Figure 8B:
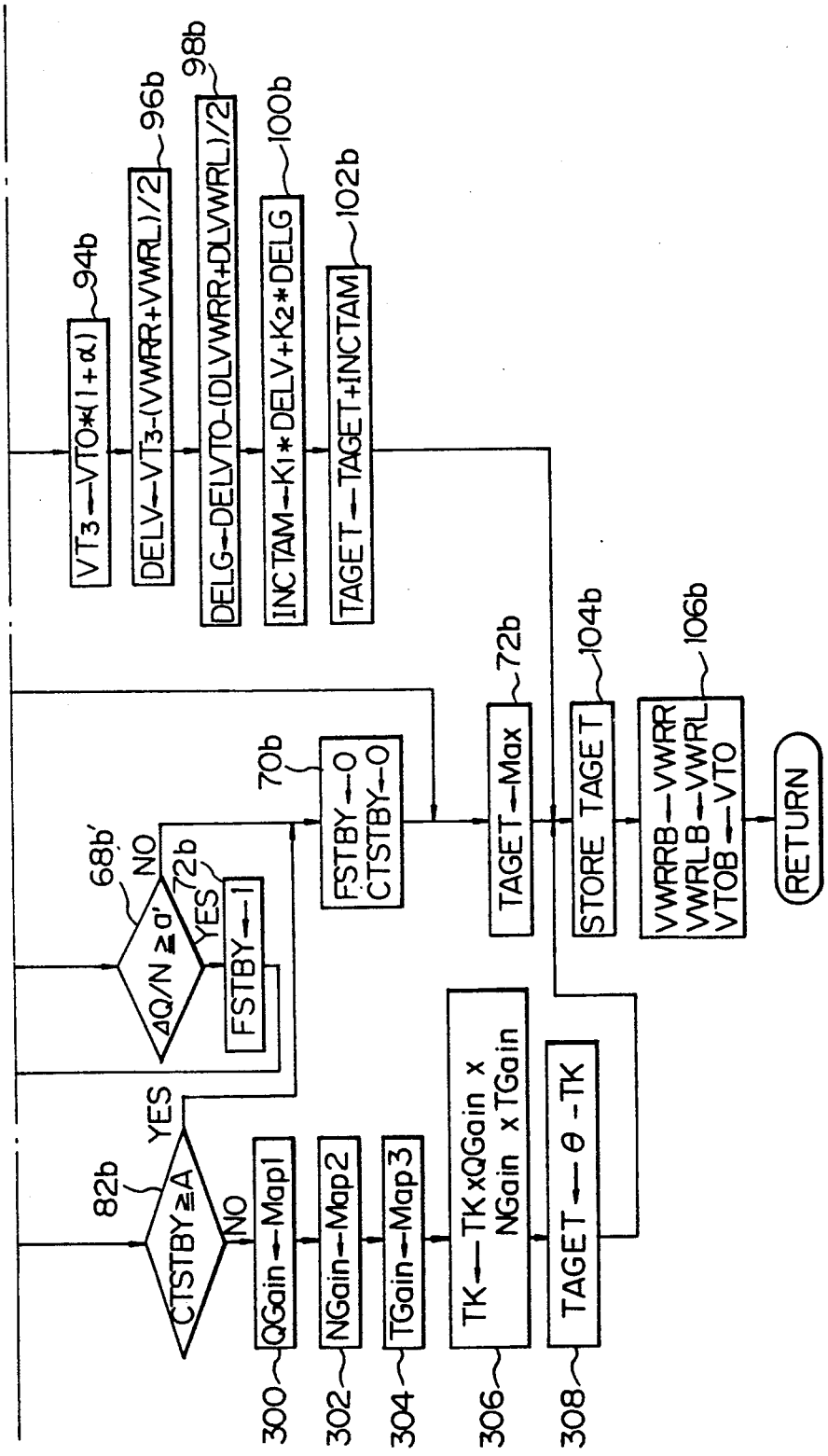

A feature of the third embodiment of the present invention is that the amount of the opening of the sub-throttle valve is more precisely controlled in the stand-by area, in which the vehicle slip is most likely to occur. FIG. 8 shows a flowchart of the operation of this embodiment. Steps which are similar to those described in FIG. 2 have the same reference numeral with a suffix b attached for discrimination.

The flowchart shown in FIG. 8 is the same as that for the first embodiment of FIG. 2, except for the stand-by control following step 300. Step 68b' is slightly different from step 68 in that, instead of the throttle valve degree of opening change rate, the rate of change $\Delta(Q/NE)$ in the ratio of the intake amount Q to the engine speed NE, as a parameter of the engine load, is employed. The TRC control area is detected at steps 56b and 58b, which are the same as steps 56 and 58 in FIG. 2. When the TRC condition is not obtained (no results at steps 56b, 58b, 60b, 62b and 68b'), the degree of opening of the sub-throttle valve 22 is controlled to be fully open (Max at step 72b). When the TRC control condition is obtained, the TRC control is carried out at steps 94b, 96b, 98b, 100b and 102b, which are similar to steps 94, 96, 98, 100 and 102, respectively, so that a target value TAGET of the degree of opening of the sub-throttle valve 22 is calculated in accordance with a first order difference DELV and a second order difference DELG, whereby slip at the driving wheels 48R and 48L is controlled.

Before the TRC control is executed, it is determined in which area a slip at the driving wheel 48R and 48L is likely to occur, by determining if $\Delta Q/NE$ is larger than a threshold value a' at step 68b'. When it is determined that the stand-by control is necessary (yes result at step 68b'), the routine goes to the stand-by routine following steps 72b, 80b and 82b, which are similar to steps 72, 80 and 82 in FIG. 2, respectively. Namely, the stand-by control for closing the sub-throttle valve to the stand-by opening degree is carried out, as long as a predetermined time corresponding to the value at the counter CTSTBY has not elapsed from the commencement of the stand-by control. After the elapse of this predetermined time without an occurrence of slip (yes result at step 82b) the stand-by control is stopped.

Figure 9:
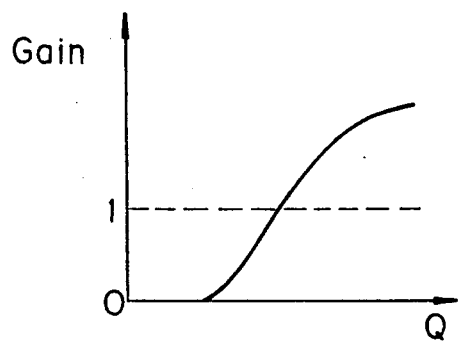
FIG. 9 shows a setting in the intake air amount correction factor GGain for the amount of closing of the sub-throttle valve with respect to the intake air amount.
Figure 10:
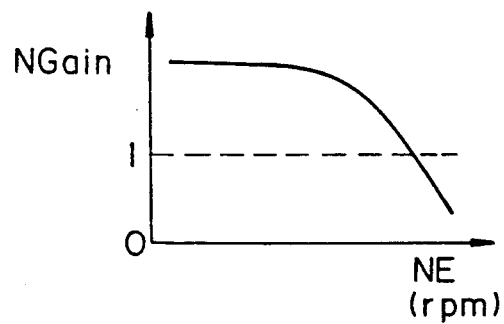
FIG. 10 shows a setting in the engine speed correction factor NGain for the amount of closing of the sub-throttle valve with respect to the engine speed.
Figure 11:
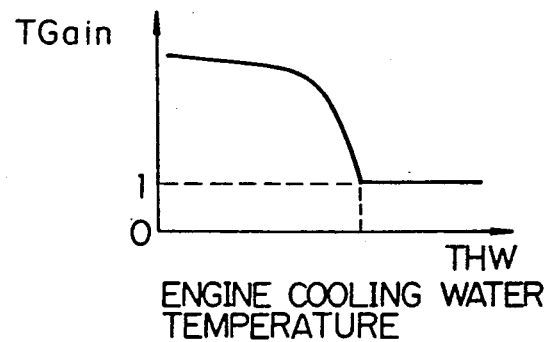
FIG. 11 shows a setting in the cooling temperature correction factor TGain for the amount of closing of the sub-throttle valve with respect to the cooling water temperature, in the third embodiment of the present invention.

The essence of this embodiment lies in the setting of the stand-by opening degree following step 300. In this embodiment, the stand-by opening degree is calculated based not only on the engine speed, as in the first or second embodiment, but also on other engine operating conditions such as an intake air amount or engine temperature. This improvement obtains a better stand-by opening which is small enough to lower the engine torque to prevent wheel slip but is high enough to obtain a good acceleration performance. When it is determined that the value of counter CTSTBY is lower than a predetermined value A, i.e., a predetermined time has not elapsed from the start of the stand-by operation, the routine goes to step 300 and an intake air amount correction factor QGain is calculated from map 1 shown in FIG. 9, to step 302 where an engine speed correction factor NGain is calculated from map 2 shown in FIG. 10, and to step 304 where an engine water temperature correction factor TGain is calculated from a map 3 as shown in FIG. 11. Then the routine goes to step 306 and the target value TAGET of the degree of opening of the sub-throttle valve 22 is calculated by the following equation, $$TAGET = TK \times QGain \times NGain \times TGain,$$

where TK is a value of the degree of opening of the sub-throttle valve 22 when closed with regard to the value of the degree $\theta$ of the main sub-throttle valve 16 detected by the sensor 46. The above equation allows corrections by the QGain, NGain and TGain to be applied to this value TK for obtaining a desired value of the degree of the opening of the sub-throttle valve 22. QGain and NGain are parameters for correcting the amount TK in accordance with engine torque. If the sub-throttle valve 22 is merely closed to the opening TK, which is the degree of opening of the main throttle valve 16 minus a predetermined amount, a desired control of the vehicle cannot be obtained over all regions of the engine operation. When the closed amount is too small with regard to the optimum value, an acceleration slip will occur. Contrary to this, when the closed amount is too large with regard to the optimum value, the engine acceleration performance will be poor. According to this embodiment, the stand-by opening TK is corrected by QGain and NGain in accordance with the engine torque parameter. FIGS. 9 and 10 show how these correction factors QGain and NGain are changed in accordance with intake amount Q and engine speed NE, respectively. As explained with regard to the first embodiment, with reference to FIG. 4(a), the stand-by opening degree TAGET is determined as a value of the throttle opening at which the engine output torque is sharply lowered when the throttle valve opening is changed. This point is designated b $P_{800}$, $P_{1200}$, $P_{1600}$, $P_{2000}$ or $P_{2400}$ in accordance with engine speed NE. The values of the degree of opening of the throttle valve at these points cannot be obtained merely from the degree of opening of the main throttle valve 16 minus a predetermined fixed value, since non-linear relationships exist not only between the stand-by opening and the engine torque but also between the stand-by opening and the engine speed. In view of this, the stand-by opening degree TK is corrected in accordance with engine torque parameters, to obtain the best stand-by control. At step 308, the target value TAGET of the sub-throttle valve 22 is calculated at the degree of opening $\theta$ of the main throttle valve 16 subtracted by TK.

When compared with the first embodiment, this second embodiment obtains a appropriate value of the stand-by throttle opening degree. In the first embodiment, as will be seen from FIG. 4(b), only a parameter of the engine speed NE is incorporated, but this third embodiment of FIG. 8 incorporates not only the engine speed parameter (NGain) but also an intake air amount parameter (QGain), both of which affect the engine output torque, and as a result, a better slip control of the vehicle can be obtained.

In the third embodiment, other engine torque parameters such as the degree of main throttle valve 16 can be used, when combined with the engine speed parameter. Furthermore, a control is possible such that the stand-by opening degree of the sub-throttle valve 22 is reduced in accordance with the position of the transmission of the vehicle, such that the lower the shift speed position the larger the amount of closing of the throttle valve. The large closing amount of the sub-throttle valve 22 allows any slip at the wheel to be quickly controlled. Furthermore, even if a slip does not actually occur, this largely closed sub-throttle valve does not adversely affect the acceleration performance because the engine output torque can be easily increased to obtain a desired acceleration performance at the low speed shift position.

It should be noted that a correction of the stand-by throttle valve opening degree based on the engine temperature at step 304, by the TGain, is employed. As will be seen from FIG. 11, the value of the TGain is increased in accordance with a lowering of the engine cooling water temperature THW. When the engine cooling water temperature is low, the fuel cut operation for reducing engine torque, which is usually carried out during the TRC control operation (steps 220 to 224 in the second embodiment in FIG. 6) cannot be carried out, and thus the sub-throttle valve 22 is further closed, to lower the engine torque.

FIG. 12 show a general view of the fourth embodiment, wherein parts which are similar with reference to FIG. 1 are given the same reference numerals, with a suffix c added for discrimination. In this embodiment, only one throttle valve 400 is provided and does not act only for the main throttle valve 16 and sub-throttle valve 22 of the preceding embodiments. The throttle valve 400 is a link-less throttle valve having no mechanical connection between the throttle valve 400 and the accelerator pedal 18c. An actuator 404 is connected to the throttle valve 400, and an electrical control circuit 46c is constructed such that an opening of the throttle valve 400 is controlled during the normal operation of the engine, to correspond to a degree of depression of the accelerator pedal 18c. A sensor 408 is provided for detecting the degree of depression of the accelerator pedal 18c. When a traction control is executed, the opening of the throttle valve 400 is controlled so that an acceleration slip is controlled. Furthermore, a stand-by control in accordance with the engine torque is executed as in the first embodiment in FIG. 2. Still further, a fuel cut operation as in the second embodiment in FIG. 6 is carried out.

The operation of this embodiment will be explained with reference to FIG. 13. This routine is carried out at predetermined short intervals. At step 500, values of the degree $\theta_{ac}$ of opening of the throttle valve, the speed VWRR and VWRL of the rear right and left wheels as driving wheels, and the speed VWFR and VWFL of the front right and left wheels as driven wheels, measured by the sensors 48R and 48L, and 50R and 50L, respectively, are read out. At step 502, a difference DLVWRR of the speed of the right rear wheel speed VWRR of this timing, from the right rear wheel speed VWRRB obtained at the preceding timing, i.e., $$DLVWRR = VWRR - VWRRB,$$

is calculated, and a difference DLVWRL of the speed of the left rear wheel speed VWRL of this timing, from the right left wheel speed VWRLB obtained at the preceding timing, i.e., $$DLVWRL = VWRL - VWRLB,$$

is calculated. At the following step 504, an average value VTO of the right forward wheel speed VWFR and left forward speed VWFL, i.e., $$VTO = (VWFR + VWFL)/2$$

is calculated. This is an estimated speed of the vehicle. Then, a difference DELVTO of a vehicle mean speed VTO at this timing, from a speed VTOB obtained at the preceding timing, i.e., $$DELVTO = VTO - VTOB$$

is calculated.

At step 506, a difference $\Delta$TAM of the degree of opening TAM of the throttle valve 400 of this timing from that of the TAMB obtained at the preceding timing is calculated, which difference is a rate of change in the degree of opening of the throttle valve 400. At step 508, it is determined if the speed VWRR of the right rear driving wheel is equal to or higher than VTO+$X_1$, and at step 510, it is determined if the speed VWRL of the left rear driving wheel is equal to or higher than VTO+$X_2$. $X_1$ and $X_2$ are predetermined values, respectively. The satisfaction of one of the above equations means that the speed of the driving wheel with respect to the vehicle speed VTO is high enough to determine that slip has occurred at the driving wheels.

When it is determined that there is no slip (no result at steps 508 and 510), the routine goes to step 512 where it is determined if a flag FTRC is set (1). This FTRC is set (=1) when a slip control is carried out and is reset (=0) when a slip control is not carried out. When it is determined that the slip control is not carried out (FTRC =0), the routine goes to step 514 and it is determined if a standby flag FSTB is set (1). The FSTB is set (=1) when a standby control is carried out and is reset (=0) when the standby control is not carried out. The stand-by control refers to an operation whereby an operating condition wherein a slip at wheels is likely to occur is predicted, and the sub-throttle valve is closed to a position at which the slip is controlled. When the FSTBY has an initial value (0), the routine goes to step 515 to increment a counter CLDY, which measures a time from the end of the preceding stand-by control by a lapse of the time limit determined at step 538. At step 518 it is determined if CDLY>C. When it is determined that a predetermined time has elapsed from the ending of the stand-by control, the routine goes to step 520 to move C to CDLC, and to step 522 to determine if $\Delta$TAM is larger than a predetermined value b, i.e., a stand-by condition exists wherein slip at wheels is likely to occur. When it is determined that $\Delta$TAM>b, the routine goes to step 524 to set a flag FSTBY.

When a predetermined time has not elapsed from the ending of the stand-by condition, i.e., CDLY<C, the determination at the step 522 is by-passed. If the stand-by control is finished within the time limit, this shows that the road surface has a large friction coefficient $\mu$, and the degree of opening of the throttle valve 400 is automatically returned to a degree of opening obtained in accordance with the degree of depression of the accelerator pedal at step 532. In this case, the rate of the change $\Delta$TAM of the throttle valve opening will have a large value, which may exceed the threshold value b at step 522, and this causes a erroneous detection of the stand-by control. To obviate this difficulty, when it is determined that CDLY<C, the determination at step 522 of a stand-by condition is by-passed.

At step 526, it is determined if the value of the left driving wheel speed VWRL is higher than the estimated vehicle speed VTO plus a predetermined value $X_1/2$, and at step 528, it is determined if VWRL is lower than VTO plus $X_2/2$. Thereafter, the routine goes to step 530 and the stand-by flag is reset (0), a counter CSTBY for counting the duration time of the stand-by control is cleared, and a flag FTAM is reset. At step 532, a target value TAM of the opening of the throttle valve 400 is calculated to obtain a degree of opening of the throttle valve 400 during a usual operation of the link-less throttle valve system. As is well known, a map of target values of the degree of opening of the throttle valve with respect to values of the depression of the accelerator pedal 18c is provided, and a target value TAM of the opening of the throttle valve corresponding to a detected degree of depression of the accelerator pedal 18c is calculated by a map interpolation method. Then, at step 533, TAM is moved to TAGET.

When a stand-by control condition is obtained, the routine goes to step 534 and a counter CDLY is cleared, and to step 536 where a counter CTSTBY is incremented. Then at step 538, it is determined if the value of the CTSTBY is larger than a predetermined value A corresponding to a predetermined lapse of time for the stand-by control. When it is determined that CTSTBY is smaller than the predetermined value A, the routine goes from step 538 to step 540, where it is determined if the flag FTAM is set (1). When FTAM=1, the routine goes to step 542 and the value of an angle KTAM of the degree of opening of the throttle valve 400 when closed from the degree of opening of the throttle valve during this stand-by operation, is calculated. This value KTAM corresponds to TK at step 306 in the third embodiment in FIG. 8. A map of values of the degree KTAM of a degree of opening of the throttle valve 400 with respect to the value of the degree of depression of the accelerator is provided, and a map interpolation calculation is executed to obtain a value of KTAM which corresponds to the value of TAM. It should be noted that the map of the value KTAM for closing the throttle valve when executing the stand-by control is determined such that a stand-by control of the throttle valve is obtained to position the throttle valve such that the output torque of the engine is lowered as shown in FIG. 4(a). As a result, a nonlinear relationship between the degree of opening of the throttle valve 400 just before the commencement of the stand-by control and the closing amount of the throttle valve for obtaining a desired stand-by operation, is compensated. At step 544, a target value ATAGET of the degree of opening of the throttle valve 400 during the stand-by control operation is carried out when, $$ATAGET = TAM - KTAM,$$

where the KTAM is calculated, as in the previous embodiments, to obtain a desired stand-by opening degree which is a degree of opening of the throttle valve whereat the engine output torque is sharply lowered at the particular engine speed NE, with respect to the engine torque at the timing of the commencement of the stand-by control. Then, at step 545, the flag FTAM is set to 1.

When any one of the requirements at steps 508, 510 and 512 is obtained, it is considered that an acceleration slip has occurred, and therefore, the routine goes to step 550 and it is determined if the traction control operation can be executed. When a control failure operation, for example, is carried out, the execution of the TRC control is permitted and the routine goes from step 550 to step 582, where the traction control flag FTRC is cleared, and then to the steps 530 and 532.

When the TRC control is permitted, the routine goes from step 550 to step 552, where the traction control flag FTRC is set (1), and to step 570 where it is determined if a traction control condition is obtained, after executing steps 554 to 562 for executing the fuel cut operation, which are similar to steps 220 to 226 in FIG. 6. For example, when the degree of opening of the sub-throttle valve 22 is larger than the degree of opening of the main throttle valve 16, the TRC control should be terminated, and therefore, the routine goes to the steps 582 and 584, to cancel the traction control.

When the TRC control should be continued, the routine goes from step 570 to step 572 and a target vehicle speed VT3 is calculated by the following equation, $$VT3 = VTO \times (1 + \alpha),$$

where $\alpha$ is a slip factor determined such that a maximum adhesion of the tires at the vehicle speed is obtained. At step 576, a first order deviation DELV is calculated by the following equation $$DELV = VT3 - (VWRR + VWRL)/2,$$

where the DELV is a target vehicle speed VTO subtracted by an average speed of the driving wheels. The DELV indicates a difference between the target speed of the driving wheels and the actual driving speed, as the first order deviation to be controlled. Then, at step 576, a second order deviation DELG is calculated by the following equation.

$$DELG = DELVTO - (DLVWRR + DLVWRL)/2,$$

where DELG is the vehicle speed change amount DELVTO per unit time obtained at step 576 and subtracted by a mean value of the driving wheel speed change amount per unit time. DELG indicates a rate of change in the control deviation, i.e., the control deviation is increasing or decreasing. At step 578, a control amount INCTAM in the control signal for operating the sub-throttle valve 22 is calculated by the following equation, $$INCTAM = K_1 \times DELV + K_2 \times DELG,$$

where $K_1$ and $K_2$ are feedback gains, and at step 580, the target opening degree TAGET of the sub-throttle valve 22 is calculated by $$TAGET = TAGET + INCTAM,$$

which equation shows that the degree of opening of the sub-throttle valve is controlled by both a size of the control deviation (DELV) and a rate of the change in the deviation (DELG).

Figure 13B:
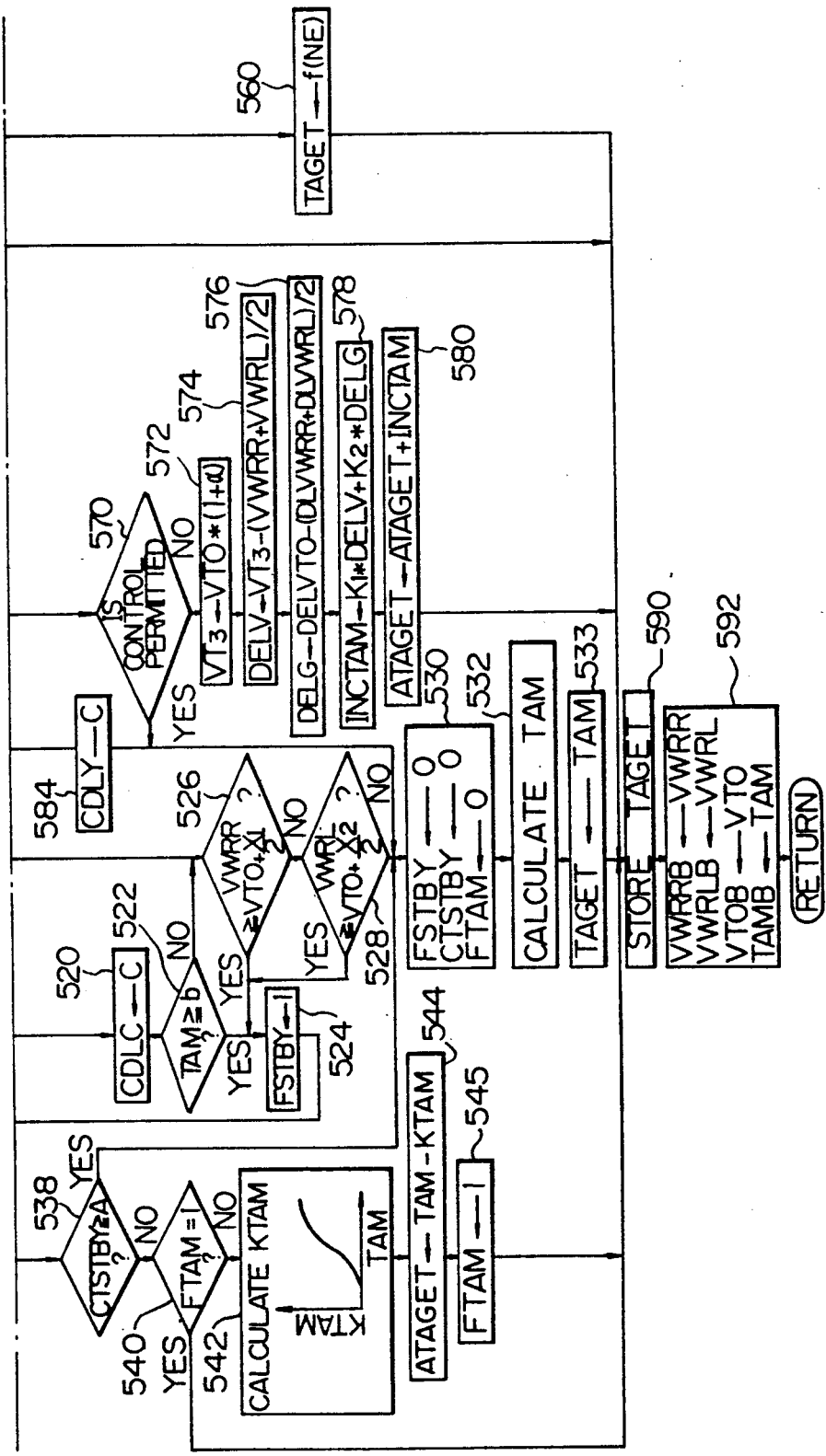

After the target value of the opening of the sub-throttle valve 22 is obtained at steps 533, 544, 560 and 580, the routine goes to step 590 where the target value is stored to a RAM area, and to step 592 where VWRR, VWRL, and VTO are moved to VWRRB, VWRLB, and VTOB, respectively, for the execution of the routine in FIG. 13, at the following timing.

This embodiment also incorporates a fuel cut operation, which is carried out after the execution of the stand-by control. The fuel cut routine is realized by steps 554 to 566. When the vehicle is in the traction control mode (FTRC=1), the routine goes to step 554 and it is determined if a flag FFCR=1. When it is determined that FFCR=0, i.e., the vehicle has just entered the traction control mode, the routine goes to step 556 and the FFC is set, to step 558 where the FFCR is set, and to step 560 where the target speed TARGET is calculated by an engine speed map f(NE). Namely, the degree of opening of the throttle valve 400 is calculated in accordance with the engine speed NE. At the next timing, the routine goes from step 554 to step 562, and then to step 564, where it is determined if the change in the engine speed Δ is larger than a predetermined value Δ1, and the fuel cut is continued until the engine speed change is lower than Δ1. After the change in the engine speed one lower than Δ1 is obtained, (yes result at step 564) the flag FFC is cleared at step 566, the normal traction control routine is allowed to commenced, i.e., the routine goes from step 562 to the routine following step 570 to execute the control of the degree of opening so that the slip is controlled.

The stand-by control (steps 534 to step 545) can lower the intake pressure, and the traction control (step 550 to 580) is then commenced. The low intake pressure caused by a preceding stand-by control can lower the ignition voltage when the fuel cut routine (steps 554 to 566) is carried out, which prevent an increase of the voltage in the ignition device to above the permissible value.

Figure 14:
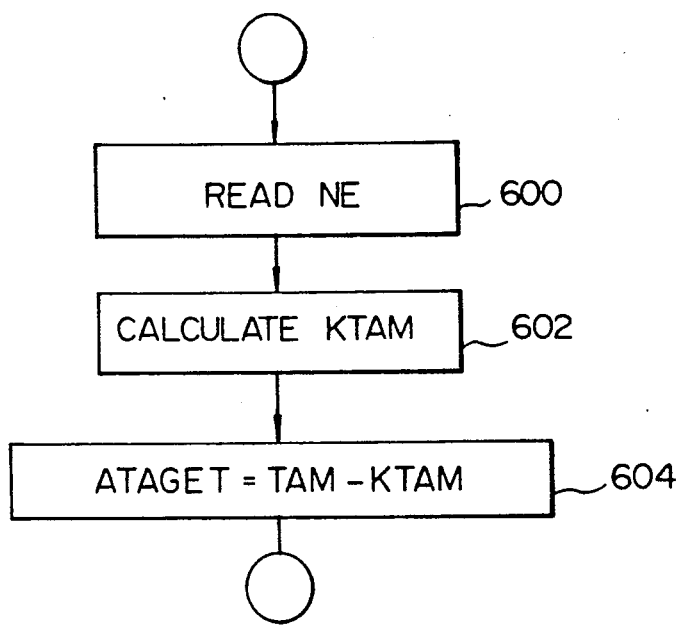
FIG. 14 shows a modification of a routine for setting a stand-by opening degree applied to the link-less throttle valve type of engine.
Figure 15:
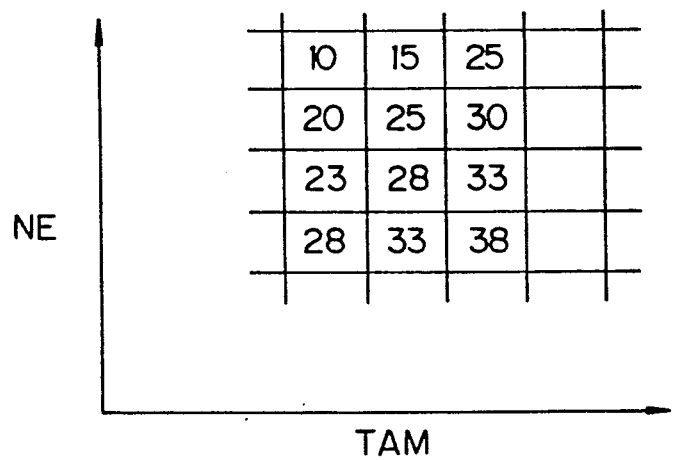
FIG. 15 shows a map for determining the value of the closing of the throttle valve during the stand-by operation.

FIG. 14 is a routine for calculating a degree of the opening ATAGET of the throttle valve 400 during the stand by mode, in a modified embodiment thereof, and this routine should be used in FIG. 13 in place of steps 240 to 245. At step 600, the engine speed NE is read-out, and at step 602 the correction amount KTAM of the degree of opening of the throttle valve 400 is calculated. FIG. 15 shows how a map of the KTAM is constructed. This map has TKAM values with respect to combinations of the engine speed NE and the value of the opening TAM, which is the value of the degree of opening of the throttle valve determined in accordance with the degree of depression of the accelerator. At step 604, the target value ATAGET of the opening of the throttle valve 400 during the stand-by control is calculated as TAM subtracted by KTAM. Namely, the degree of closing of the throttle valve when the occurrence of slip is predicted is calculated in accordance with the engine torque condition, which allows the obtaining of a degree of opening of the throttle valve during the stand-by control which is as high as possible, to obtain a good acceleration performance, but which is low enough to fully suppress the slip.

In these embodiments, a learning control can be employed as outlined below. When the TRC routine enters execution, the stand-by amount is calculated as the original stand-by amount TAGET or KTAM multiplied by KX, i.e., $TAGET = KX \times TAGET$, or $KTAM = KX \times KTAM$.

An occurrence of slip regardless of the execution of the stand-by control means that the value of the TAGET or KTAM at the preceding stand-by operation intake is so small that the slip cannot be controlled. The KA is used for compensating the value of TAGET or KTAM so that the slip is controlled. The learning control will be cancelled when the ignition key switch is made OFF.

Throughout the embodiment, the incorporation of the engine torque parameter, such as engine speed or intake air amount can be made in various ways, different from those described herein, but these obtain the same operation.

Although the present invention is described with reference to embodiment, many modifications and changes can be made by those skilled in this art without departing from the scope and spirit of the present invention.

We claim:

1. A vehicle comprising:
a vehicle body;
vehicle wheels mounted on the vehicle body;
an internal combustion engine mounted on the vehicle body, an output shaft of the engine being connected to the driving wheels;
said internal combustion engine comprising an engine body, an intake line for forming a combustible mixture introduced into the engine body, an accelerator pedal, first throttle means for throttling the intake line for controlling an amount of combustible mixture introduced into the engine in accordance with a degree of depression of the accelerator pedal, and an exhaust line for removing a resultant exhaust gas from the engine body;
means for detecting slip occurring at said driving wheel when the vehicle is accelerated;
second throttle means for throttling the intake line for controlling an amount of the combustible mixture introduced into the engine regardless of the degree of depression of the accelerator pedal when an occurrence of acceleration slip is detected by said slip detection means, to reduce the amount of air-fuel mixture introduced into the engine, in such a manner that said slip occurrence is controlled;
a slip prediction means for detecting from a running condition of the vehicle a state wherein a slip in the driving wheels is likely to occur;
means for detecting an engine parameter related to the engine torque;
means for determining a condition when a slip is not detected by said detecting means and a control by said second throttle means is not commenced, and;
standby means, operative upon receiving a prediction of an occurrence of slip by said slip prediction means and a determination of said condition by said determining means, for closing the second throttle means to a degree of opening corresponding to said detected engine parameter.

2. A vehicle according to claim 1, wherein said standby means comprises at least one map means representing values of a degree of the opening of said second throttle means with respect to values of said engine torque parameter, a means for executing a map interpolation calculation for obtaining a value of a degree of opening of the second throttle means corresponding to the detected engine torque parameter, and means for outputting a signal to the second throttle means to obtain a calculated degree of opening of the second throttle means.

3. A vehicle according to claim 1, wherein said first throttle means comprise a main throttle valve mechanically connected to the accelerator pedal, wherein said second throttle valve means comprise a sub-throttle valve for throttling the intake line for controlling the amount of the combustible mixture introduced into the engine regardless of the depression of the accelerator pedal, and wherein said stand-by means comprise drive means for controlling the degree of the opening of the sub-throttle valve and means for closing the sub-throttle valve to a predetermined degree of opening when the occurrence of the slip is predicted.

4. A vehicle according to claim 3, wherein said closing means comprises at least one map means representing values of a degree of opening of said sub-throttle valve with respect to values of said engine torque parameter, and a means for executing a map interpolation calculation for obtaining a value of the stand-by degree of opening of the sub-throttle valve from said at least one map, corresponding to the detected engine torque parameter, and means for outputting a signal to the sub-throttle valve for obtaining the calculated opening of the sub-throttle valve.

5. A vehicle according to claim 4, wherein said engine torque parameter for determining the predetermined degree of the sub-throttle valve is engine rotational speed.

6. A vehicle according to claim 4, further comprising means determining if the predetermined degree of the opening of the sub-throttle valve as calculated by said map interpolation means is larger than the degree of the opening of said main throttle valve, and means for replacing the predetermined degree of the opening by the degree of the opening of the main throttle valve.

7. A vehicle according to claim 3, wherein said drive means comprising a stepping motor.

8. A vehicle according to claim 1, wherein said first throttle means comprise a throttle calve mechanically disconnected from the accelerator pedal, and drive means for controlling the degree of the opening of the throttle means in accordance with the degree of the depression of the accelerator pedal, wherein said second throttle means comprise control means for controlling the drive means so that the degree of the opening of the throttle valve is controlled in accordance with the degree of the slip as occurred and detected by said slip detection means, and wherein said stand-by means control the drive means for controlling the degree of the opening of the throttle valve to close to a predetermined degree when the occurrence of the slip is predicted by said slip prediction means.

9. A vehicle according to claim 8, wherein said control means comprises at least one map means representing values of a degree of opening of said throttle valve with respect to values of said engine torque parameter, a means for executing a map interpolation calculation for obtaining a value of the stand-by degree of opening of the throttle valve from said at least one map, corresponding to the detected engine torque parameter, and means for operating the throttle valve to obtain the calculated stand-by degree of opening of the throttle valve.

10. A vehicle according to claim 6, wherein said stand-by means determine the predetermined degree of the throttle valve in accordance with, as said torque parameters, the degree of the throttle valve and the engine speed when the occurrence of the slip is predicted.

11. A vehicle according to claim 8, wherein said drive means comprises a stepping motor.

12. A vehicle according to claim 1, further comprising means for cutting the supply of fuel to the engine when an occurrence of the slip is detected by the slip detection means, said closure of the second throttle means to the predetermined degree by said stand-by means being obtained prior to the execution of the fuel cut by said fuel cut means.

13. A vehicle according to claim 7, further comprising means for detecting a degree of change in the engine speed after commencing the fuel cut operation, and means for cancelling the fuel cut operation upon a detection of a predetermined value of a drop in the engine speed.

14. A vehicle according to claim 1, wherein said slip prediction means comprise means for detection of rate of change in the degree of the first throttle means, and means for predicting an occurrence of the slip by determining if the detected rate in the degree of the first throttle means is larger than a predetermined value.

15. A vehicle according to claim 1, wherein said slip prediction means comprise means for detection of ratio of the amount of the intake air to the engine speed, and means for predicting an occurrence of the slip by determining if the detected ratio is larger than a predetermined value.

16. A vehicle according to claim 1, further comprising means for detecting a lapse of time after a commencement of the closing of the second throttle means by said standby means under said condition, and cancelling the operation of the standby means after a predetermined time is detected by said detecting means.

* * * * *

UNITED STATES PATENT AND TRADEMARK OFFICE
CERTIFICATE OF CORRECTION

PATENT NO. : 5,096,016

DATED : March 17, 1992

INVENTOR(S) : Tada et al.

It is certified that error appears in the above-identified patent and that said Letters Patent is hereby corrected as shown below:

Column 5      line 50, change "values" to --values.--;

Column 12     line 34, change "b" to --by--;

Column 16     lines 19-22 , change to normal text-size typeface;

Column 19     line 39, change "control" to --controls--;
              line 40, change "control" to --controls--.

Signed and Sealed this

Twenty-eighth Day of June, 1994

Attest:

BRUCE LEHMAN

*Attesting Officer*     *Commissioner of Patents and Trademarks*